(12) United States Patent
Bansal et al.

(10) Patent No.: US 11,412,360 B2
(45) Date of Patent: Aug. 9, 2022

(54) VEHICLE-TO-EVERYTHING DATA TRANSFER FOR AUTOMATED VEHICLES

(71) Applicant: TOYOTA JIDOSHA KABUSHIKI KAISHA, Toyota (JP)

(72) Inventors: Gaurav Bansal, Mountain View, CA (US); Hongsheng Lu, Mountain View, CA (US); John Kenney, Mountain View, CA (US)

(*) Notice: Subject to any disclaimer, the term of this patent is extended or adjusted under 35 U.S.C. 154(b) by 272 days.

(21) Appl. No.: 16/122,868

(22) Filed: Sep. 5, 2018

(65) Prior Publication Data

US 2020/0077240 A1 Mar. 5, 2020

(51) Int. Cl.
*H04W 4/44* (2018.01)
*H04W 72/04* (2009.01)
*G06N 20/00* (2019.01)
*H04W 12/06* (2021.01)

(52) U.S. Cl.
CPC .......... *H04W 4/44* (2018.02); *G06N 20/00* (2019.01); *H04W 12/06* (2013.01); *H04W 72/04* (2013.01)

(58) Field of Classification Search
None
See application file for complete search history.

(56) References Cited

U.S. PATENT DOCUMENTS

| | | |
|---|---|---|
| 2013/0203400 A1 | 8/2013 | Ricci |
| 2017/0196029 A1 | 7/2017 | Geerlings et al. |
| 2017/0278323 A1* | 9/2017 | Gupta .................. H04W 64/00 |
| 2017/0334450 A1* | 11/2017 | Shiraishi ............... B60W 30/06 |
| 2018/0220283 A1 | 8/2018 | Condeixa et al. |
| 2019/0007894 A1* | 1/2019 | Subramanian .......... H04W 4/02 |
| 2019/0137287 A1* | 5/2019 | Pazhayampallil ..... G01C 21/32 |
| 2019/0289445 A1* | 9/2019 | Wang ...................... H04W 8/22 |
| 2019/0350046 A1* | 11/2019 | Wang ...................... H04W 4/08 |
| 2019/0394700 A1* | 12/2019 | Lekutai ................. H04W 40/14 |
| 2020/0021941 A1* | 1/2020 | Nguyen ................ H04W 40/12 |
| 2020/0035000 A1* | 1/2020 | Raut .................... G08G 1/0967 |
| 2020/0092685 A1* | 3/2020 | Fehrenbach ....... H04B 7/15507 |

OTHER PUBLICATIONS

EPO, Extended European Search Report for European Patent Application No. 19194542.7, dated Nov. 21, 2019, 13 pages.
Kwon, "Improving multi-channel wave-based V2X communication to support advanced driver assistance system (ADAS)," International Journal of Automotive Technology, vol. 17, No. 6, Aug. 2, 2016, pp. 1113-1120.
EPO, Communication Pursuant to Article 94(3) EPC for European Patent Application No. 19194542.7, dated Oct. 22, 2021, 6 pages.

* cited by examiner

*Primary Examiner* — Scott M Sciacca
(74) *Attorney, Agent, or Firm* — Burbage Law, P.C.; Jon-Michael Burbage

(57) ABSTRACT

The disclosure describes embodiments for vehicle-to-everything (V2X) data transfer for automated vehicles. In some embodiments, a method includes providing or attempting to provide, by a communication unit of an ego vehicle, digital data to a communication device based on a mode of the communication unit, where the digital data is relayed by the communication device to be received by a server. The method includes determining, by a processor of the ego vehicle, feedback that describes a bandwidth constraint of the communication unit. The method includes modifying, by the processor, the mode based on the feedback so that the mode is consistent with the bandwidth constraint and the digital data is successfully received by the server.

20 Claims, 8 Drawing Sheets

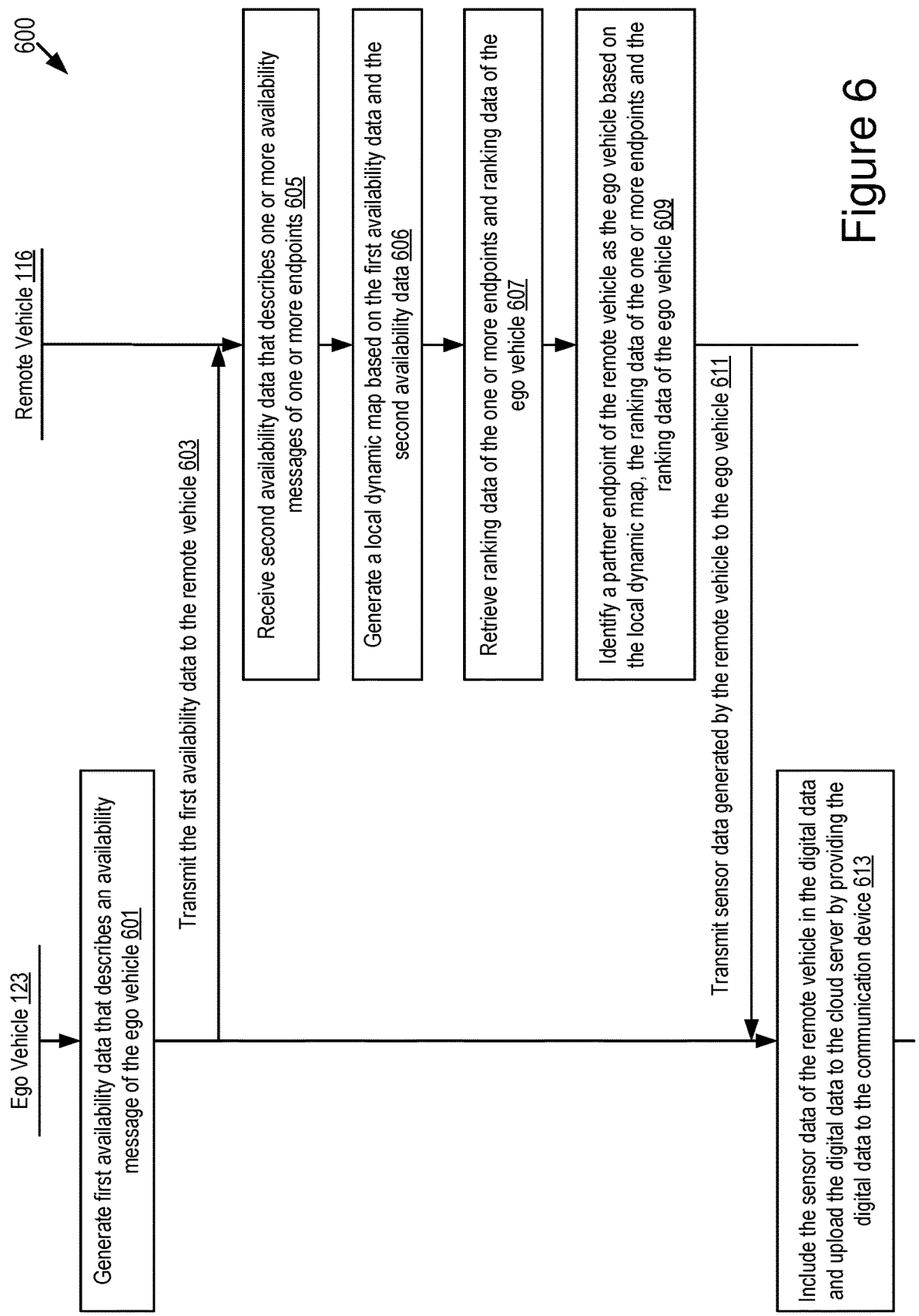

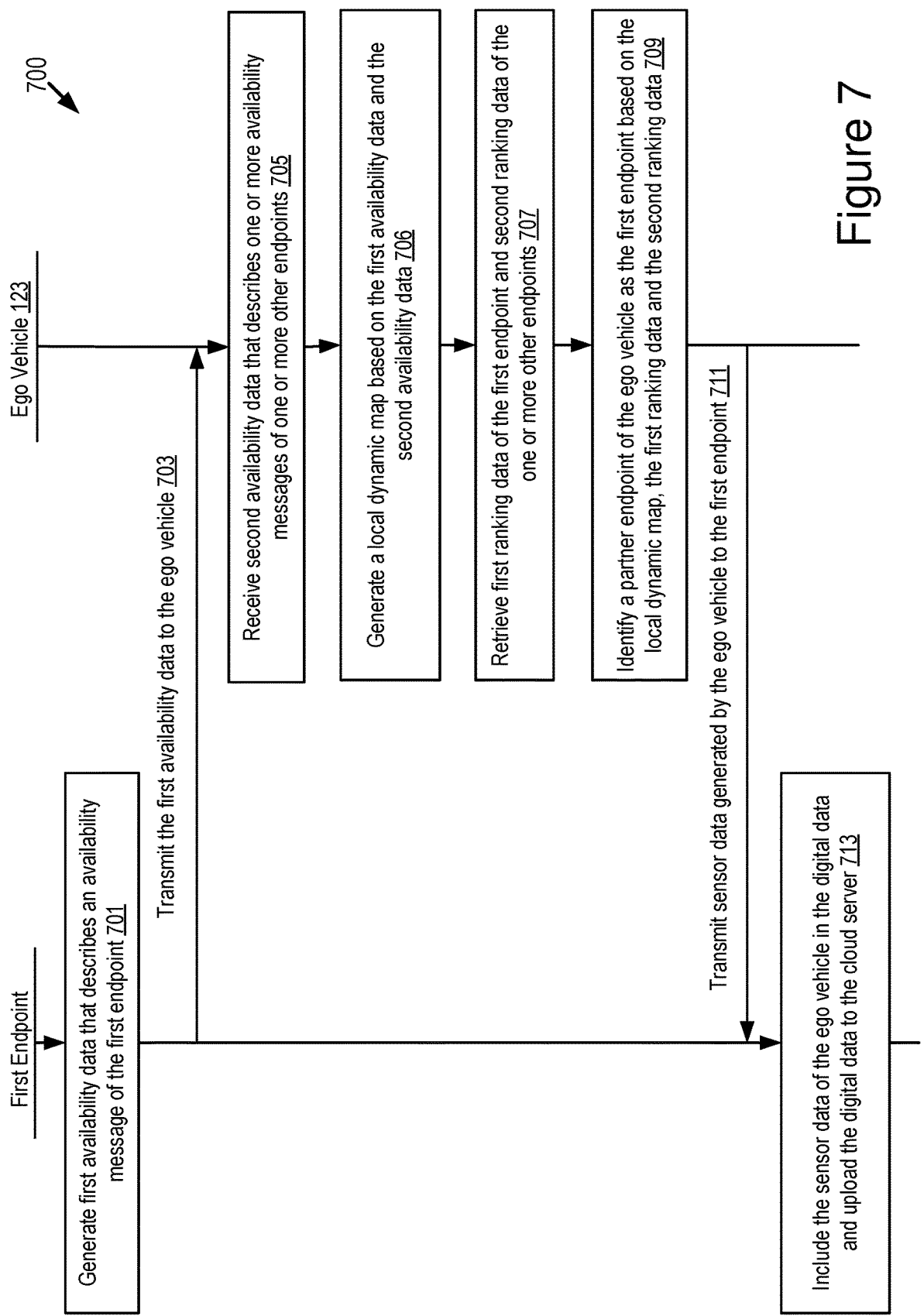

VEHICLE-TO-EVERYTHING DATA TRANSFER FOR AUTOMATED VEHICLES

BACKGROUND

The specification relates to Vehicle-to-Everything (V2X) data transfer for automated vehicles. More particularly, embodiments of the specification relate to automatically uploading digital data from automated vehicles to a server.

Automated vehicles are becoming increasingly popular. An obstacle in automated vehicle technology is that sensor data generated by each of these automated vehicles needs to be aggregated and analyzed to ensure proper functioning of the automated vehicles. Accordingly, there is a need to ensure that the sensor data generated by the automated vehicles is uploaded to a cloud server.

In some scenarios, each automated vehicle generates about 50 gigabytes of sensor data per hour (50 GB/hr), which is a huge amount of data that requires that each automated vehicle have consistent and high-quality access to a wireless network so that the sensor data can be uploaded to the cloud server through the wireless network. However, some automated vehicles may not have access to a wireless network, or their access may be inconsistent or low-quality, which makes it difficult or impossible for these vehicles to ever upload their sensor data to the cloud server.

An existing solution to upload sensor data to the cloud server is to have automated vehicles connect to their driver's home wireless network when the vehicles are parked at home. However, this solution does not adequately solve the problem of automated vehicles that are unable to access a home wireless network for some reasons, such as one or more of the following situations: a driver's home does not have a wireless network; the driver's parking space is too far from a network router; the driver's parking space is in a garage such that the automated vehicle's WiFi radio cannot connect with the home wireless network; the driver's parking space is underground such that the automated vehicle's WiFi radio cannot connect with the home wireless network; the driver has never inputted a WiFi password to the automated vehicle; and the driver's home WiFi password changes but the driver has not updated the WiFi password for the vehicle.

SUMMARY

Described herein are embodiments of a feedback system that is an element of a connected vehicle. The feedback system beneficially solves the problems of some automated vehicles that have a bandwidth constraint and fail to upload their sensor data to a cloud server by removing the bandwidth constraint of the automated vehicles and using V2X communications to forward the sensor data to other connected vehicles that have no bandwidth constraint, so that the other connected vehicles relay the sensor data to the cloud server. As a result, all automated vehicles with or without a bandwidth constraint can have their sensor data automatically uploaded to the cloud server.

There is no existing solution that provides the functionality of automatically uploading sensor data generated by automated vehicles having a bandwidth constraint to a cloud server. For example, an existing solution is unable to help automated vehicles upload their sensor data to a cloud server if these automated vehicles do not have their own high-quality access to a home wireless network. The feedback system described herein solves this problem by ensuring that all vehicles are able to upload their sensor data to the cloud server, regardless of the quality of their access to a home wireless network. The feedback system described herein works even if an automated vehicle including the feedback system has no access to a home wireless network. The feedback system also works for all levels of automated vehicles.

In some embodiments, the feedback system is installed in an automated vehicle and provides the automated vehicle with access to a wireless network in situations where the automated vehicle is unable to upload its sensor data to the cloud server. These situations include, but are not limited to, the following: a home router is out of communication range of a connected vehicle; a home router does not exist, malfunctions or has low quality access to the Internet; an owner of a connected vehicle never provides a WiFi password to his/her connected vehicle so that, even if the connected vehicle is within a WiFi range of a home router that has good access to the Internet, the connected vehicle cannot offload its aggregated sensor data to the home router.

In some embodiments, the feedback system is operable on an electronic control unit (ECU) of an automated vehicle. The automated vehicle is any level of automated vehicles, e.g., Levels 1, 2, 3, 4 or 5. Assume that all automated vehicles may include the feedback system and a roadway environment includes: an ego vehicle; and one or more remote vehicles. The ego vehicle and remote vehicles are automated vehicles that include the feedback system. The feedback system of the ego vehicle monitors the ego vehicle's access to a home wireless network over time. The feedback system of the ego vehicle generates connectivity data that describes the ego vehicle's access to the home wireless network. The feedback systems of the remote vehicles also determine connectivity data that describes their own access to a home wireless network.

The feedback system of the ego vehicle stores threshold data that describes a connectivity threshold. The feedback system of the ego vehicle compares the connectivity access of the ego vehicle described by the connectivity data to the connectivity threshold. If the connectivity threshold is satisfied by the connectivity access described by the connectivity data of the ego vehicle, then the ego vehicle has sufficiently good access to the home wireless network to relay sensor data to the home wireless network, and so, the feedback system of the ego vehicle goes into "receiver mode." If the connectivity threshold is not satisfied by the connectivity access described by the connectivity data of the ego vehicle, then the ego vehicle does not have sufficiently good access to the home wireless network to relay sensor data to the home wireless network, and so, the feedback system of the ego vehicle goes into "transmitter mode."

Next, the feedback system of the ego vehicle executes different processes depending on whether it is in a transmitter mode or a receiver mode. The outcome of either of these processes is that the feedback systems included in automated vehicles having better access to a home wireless network use V2X communication to receive the sensor data generated by those automated vehicles having poorer access to a home wireless network. The feedback systems of automated vehicles having the better access to a home wireless network then upload their own sensor data, as well as the sensor data of other vehicles having poorer access to a home wireless network, to a cloud server. In this way, the feedback systems of automated vehicles ensure that automated vehicles having poorer access, or no access, to a home wireless network are always able to upload their sensor data to the cloud server so that all the sensor data can be accessed and analyzed via the cloud server.

In some embodiments, the feedback system of an automated vehicle having poorer access to a home wireless network uploads its sensor data to a roadside unit (RSU) using vehicle-to-infrastructure (V2I) communication with the roadside unit, and the roadside unit then uploads the sensor data to the cloud server.

In some embodiments, the feedback system of an automated vehicle includes a machine learning module that determines feedback describing a bandwidth constraint of a communication unit of the automated vehicle. For example, the bandwidth constraint describes that the communication unit of the automated vehicle has insufficient bandwidth (e.g., no bandwidth or very limited bandwidth) to upload sensor data to a cloud server via a communication device (such as via a home router).

The feedback system is operable to remove the bandwidth constraint of the automated vehicle by modifying a mode of the communication unit based on the feedback so that the mode is consistent with the bandwidth constraint. The mode of the communication unit can be one of a receiver mode and a transmitter mode. For example, the feedback system is operable to modify the mode of the communication unit from the receiver mode to the transmitter mode so that the bandwidth constraint of the communication unit is removed. In this case, the communication unit is in the transmitter mode, and instead of using wireless communication with a router that causes the bandwidth constraint, the communication unit of the automated vehicle uses V2X communication to relay its sensor data to other vehicles that have no bandwidth constraint for uploading the sensor data to the cloud server.

As a result, the automated vehicle, regardless of having a bandwidth constraint or having no bandwidth constraint, can have its sensor data to be received by the cloud server timely. Thus, the efficiency of data upload to the cloud server is improved, so that the cloud server can analyze the sensor data timely to generate modification data for enhancing functionality of the automated vehicle. For example, the modification data can make the operation of the automated vehicle (e.g., operation of hardware and software in the automated vehicle) safer and more efficient. The modification data is determined on the sensor data that is successfully received by the cloud server.

Correspondingly, an additional benefit of the feedback system includes its capability of receiving the modification data from the cloud server to cause a modification of a vehicle component based on the modification data. For example, the vehicle component is an Advanced Driver Assistance System (ADAS system) which is modified based on the modification data so that performance of the ADAS system can be improved.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method including: providing or attempting to provide, by a communication unit of an ego vehicle, digital data to a communication device based on a mode of the communication unit, where the digital data is relayed by the communication device to be received by a server; determining, by a processor of the ego vehicle, feedback that describes a bandwidth constraint of the communication unit; and modifying, by the processor, the mode based on the feedback so that the mode is consistent with the bandwidth constraint and the digital data is successfully received by the server. Other embodiments of this aspect include corresponding computer systems, apparatus, and computer programs recorded on one or more computer storage devices, each configured to perform the actions of the methods.

Implementations may include one or more of the following features. The method where modifying the mode removes the bandwidth constraint. The method further including receiving modification data that is operable to modify a vehicle component of the ego vehicle, where the modification data is determined based on the digital data that is successfully received by the server so that providing the digital data to the server causes a modification of the vehicle component. The method where the ego vehicle is an autonomous vehicle and the vehicle component is an Advanced Driver Assistance System (ADAS system) which is modified based on the modification data. The method where the modification data modifies a real-time safety process of the autonomous vehicle which is provided by the ADAS system and increases safety of the autonomous vehicle. The method where the modification data modifies an operation of a braking system of the ego vehicle and the operation of the braking system is controlled by the ADAS system. The method where the communication device is a router and the bandwidth constraint is caused by a factor selected from a group that consists of the following: the router does not exist; the communication unit cannot wirelessly communicate with the router; the router is outside of a transmission range of the communication unit; the router has poor access to a wireless network; the router does not have access to the wireless network; and the communication unit does not store a password for the router so that the communication unit is not authenticated to wirelessly communicate with the router. The method where the feedback is determined by the processor executing a machine learning module. The method where the digital data includes sensor data recorded by one or more sensors and the one or more sensors are elements of one or more of the ego vehicle and a remote vehicle. The method where modifying the mode based on the feedback includes selecting a selected mode for the modification from a group that includes: a receiver mode; and a transmitter mode. The method where the selected mode is the receiver mode and the digital data includes sensor data recorded by the ego vehicle and a set of remote vehicles, where operating in the receiver mode includes receiving the sensor data of the set of remote vehicles and including the sensor data of the set of remote vehicles in the digital data that is provided to the communication device. The method where the selected mode is the transmitter mode and operating in the transmitter mode includes stopping the providing of the digital data to the communication device and instead providing the digital data to a remote vehicle that is a connected vehicle that will take steps to relay the digital data to the server, where the connected vehicle is one having no bandwidth constraint that prevents the relay of the digital data to the server. Implementations of the described techniques may include hardware, a method or process, or computer software on a computer-accessible medium.

One general aspect includes a system including: an onboard vehicle computer system of an ego vehicle, including a communication unit, a processor and a non-transitory memory storing computer code which, when executed by the processor causes the processor to: provide or attempt to provide, via the communication unit of the ego vehicle, digital data to a communication device based on a mode of the communication unit, where the digital data is relayed by the communication device to be received by a server; determine feedback that describes a bandwidth constraint of the communication unit; and modify the mode based on the feedback so that the mode is consistent with the bandwidth constraint and the digital data is successfully received by the server. Other embodiments of this aspect include corresponding computer systems, apparatus, and computer programs recorded on one or more computer storage devices, each configured to perform the actions of the methods.

Implementations may include one or more of the following features. The system where the computer code, when executed by the processor, causes the processor further to: receive modification data that is operable to modify a vehicle component of the ego vehicle, where the modification data is determined based on the digital data that is successfully received by the server so that providing the digital data to the server causes a modification of the vehicle component. The system where the ego vehicle is an autonomous vehicle and the vehicle component is an Advanced Driver Assistance System (ADAS system) which is modified based on the modification data. The system where the modification data modifies a real-time safety process of the autonomous vehicle which is provided by the ADAS system and increases safety of the autonomous vehicle. The system where the modification data modifies an operation of a braking system of the ego vehicle and the operation of the braking system is controlled by the ADAS system. The system where the communication device is a router and the bandwidth constraint is caused by a factor selected from a group that consists of the following: the router does not exist; the communication unit cannot wirelessly communicate with the router; the router is outside of a transmission range of the communication unit; the router has poor access to a wireless network; the router does not have access to the wireless network; and the communication unit does not store a password for the router so that the communication unit is not authenticated to wirelessly communicate with the router. Implementations of the described techniques may include hardware, a method or process, or computer software on a computer-accessible medium.

One general aspect includes a computer program product including instructions that, when executed by a processor, causes the processor to perform operations including: providing or attempting to provide, via a communication unit of an ego vehicle, digital data to a communication device based on a mode of the communication unit, where the digital data is relayed by the communication device to be received by a server; determining feedback that describes a bandwidth constraint of the communication unit; and modifying the mode based on the feedback so that the mode is consistent with the bandwidth constraint and the digital data is successfully received by the server. Other embodiments of this aspect include corresponding computer systems, apparatus, and computer programs recorded on one or more computer storage devices, each configured to perform the actions of the methods.

Implementations may include one or more of the following features. The computer program product where the operations further includes receiving modification data that is operable to modify a vehicle component of the ego vehicle, where the modification data is determined based on the digital data that is successfully received by the server so that providing the digital data to the server causes a modification of the vehicle component. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

FIG. 6 depicts an example process when an ego vehicle operates in a receiver mode according to some embodiments.

FIG. 7 depicts an example process when an ego vehicle operates in a transmitter mode according to some embodiments.

DETAILED DESCRIPTION

Figure 1:
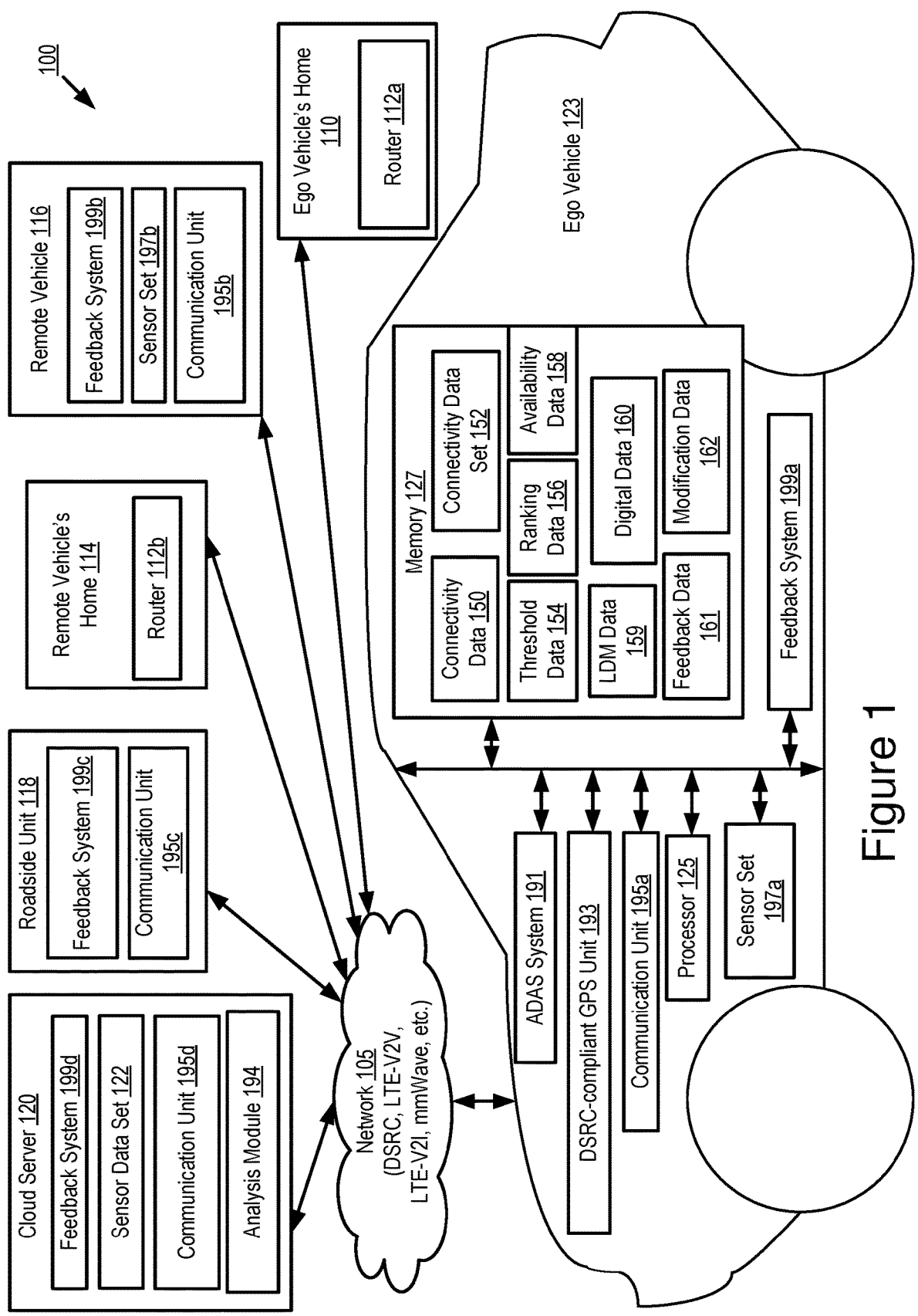
FIG. 1 is a block diagram illustrating an operating environment for a feedback system according to some embodiments.

Embodiments of a feedback system that are operable to perform V2X data transfer are now described. Examples of V2X communications described herein include one or more of the following: DSRC (including Basic Safety Messages (BSMs) and Pedestrian Safety Messages (PSMs), among other types of DSRC communication); LTE; millimeter wave communication; 3G; 4G; 5G LTE-Vehicle-to-Everything (LTE-V2X); LTE-Vehicle-to-Vehicle (LTE-V2V); LTE-Device-to-Device (LTE-D2D); Voice over LTE (VoLTE); etc.

In some embodiments, a connected vehicle that includes the feedback system is a DSRC-equipped vehicle. A DSRC-equipped vehicle is a vehicle which: (1) includes a DSRC radio; (2) includes a DSRC-compliant Global Positioning System (GPS) unit; and (3) is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages. A DSRC-compliant GPS unit is operable to provide positional information for a vehicle (or some other DSRC-equipped device that includes the DSRC-compliant GPS unit) that has lane-level accuracy. The DSRC-compliant GPS unit is described in more detail below A "DSRC-equipped" device is a processor-based device that includes a DSRC radio, a DSRC-compliant GPS unit and is operable to lawfully send and receive DSRC messages in a jurisdiction where the DSRC-equipped device is located. Various endpoints may be DSRC-equipped devices, including, for example, a roadside unit (RSU), a smart phone, a tablet computer and any other processor-based computing device that includes a DSRC radio and is operable to lawfully send and receive DSRC messages as described above.

Although the feedback system is described herein at times with reference to DSRC messages and DSRC channels, the feedback system is not limited to working with DSRC protocol messages. Any other types of V2X messages are also possible.

In some embodiments, a roadside unit that is a DSRC-equipped device does not include a DSRC-compliant GPS unit, but does include a non-transitory memory that stores digital data describing positional information for the roadside unit having lane-level accuracy, and the DSRC radio or some other system of the roadside unit inserts a copy of this digital data in basic safety message (BSM) data that is transmitted by the DSRC radio of the roadside unit. In this way, the roadside unit does not include a DSRC-compliant GPS unit but is still operable to distribute BSM data that satisfies the requirements for the DSRC standard.

A DSRC message is a wireless message that is specially configured to be sent and received by highly mobile devices such as vehicles, and is compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In the United States, Europe, and Asia, DSRC messages are transmitted at 5.9 GHz. In the United States, DSRC messages are allocated 75 MHz of spectrum in the 5.9 GHz band. In Europe and Asia, DSRC messages are allocated 30 MHz of spectrum in the 5.9 GHz band. A wireless message, therefore, is not a DSRC message unless it operates in the 5.9 GHz band. A wireless message is also not a DSRC message unless it is transmitted by a DSRC transmitter of a DSRC radio.

In some embodiments, a DSRC-equipped vehicle does not include a conventional global positioning system unit ("GPS unit"), and instead includes a DSRC-compliant GPS unit. A conventional GPS unit provides positional information that describes a position of the conventional GPS unit with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in on a roadway.

In some embodiments, a DSRC-compliant GPS unit is operable to identify, monitor and track its two-dimensional position within 1.5 meters of its actual position 68% of the time under an open sky.

In some embodiments, the feedback system is operable on an ECU of an automated vehicle. The automated vehicle is any level of automated vehicle, e.g., Levels 1, 2, 3, 4 or 5. For example, all automated vehicles may include the feedback system. An operating scenario of the feedback system includes a roadway environment with an ego vehicle, one or more roadside units and one or more remote vehicles. The ego vehicle and remote vehicles are automated vehicles that include the feedback system. Each of the roadside unit also includes the feedback system.

In some embodiments, the feedback system of the ego vehicle monitors the ego vehicle's access to a home wireless network over time. The feedback system of the ego vehicle generates connectivity data. For example, the connectivity data is digital data that describes the ego vehicle's access to the home wireless network. Similarly, the feedback systems of the remote vehicles determine connectivity data that describes their own access to a home wireless network.

The feedback system of the ego vehicle stores threshold data. For example, the threshold data is digital data that describes a connectivity threshold. The feedback system of the ego vehicle compares the connectivity access of the ego vehicle described by the connectivity data to the connectivity threshold. If the connectivity threshold is satisfied by the connectivity access described by the connectivity data of the ego vehicle, then the ego vehicle has sufficiently good access to the home wireless network to relay sensor data to the network, and so, the feedback system of the ego vehicle goes into a "receiver mode." If the connectivity threshold is not satisfied by the connectivity access described by the connectivity data of the ego vehicle, then the ego vehicle does not have sufficiently good access to the home wireless network to relay sensor data to the network, and so, the feedback system of the ego vehicle goes into a "transmitter mode."

The feedback system of the ego vehicle executes different processes depending on whether it is in the transmitter mode or receiver mode. The outcome of either of these processes is that the feedback systems included in automated vehicles having better access to a home wireless network use V2X communication to receive the sensor data generated by those automated vehicles having poorer access to a home wireless network. The feedback systems of automated vehicles having the better access to a home wireless network then upload their own sensor data, as well as the sensor data of other vehicles having poor access to a home wireless network, to a cloud server. In this way, the feedback systems beneficially ensure that automated vehicles having poorer access, or no access, to a home wireless network are always able to upload their sensor data to the cloud server so that all the sensor data can be accessed and analyzed. Details of operations performed in the receiver mode are provided below with reference to FIGS. 4 and 6. Details of operations performed in the transmitter mode are provided below with reference to FIGS. 5 and 7.

In some embodiments, the feedback system of an automated vehicle includes a machine learning module that determines feedback describing a bandwidth constraint of a communication unit of the automated vehicle. Details of the machine learning module are provided with reference to FIG. 2.

In some embodiments, the feedback system is operable to remove the bandwidth constraint of the automated vehicle by modifying a mode of the communication unit based on the feedback so that the mode is consistent with the bandwidth constraint. In some embodiments, the feedback system is operable to receive modification data from the server to cause a modification of a vehicle component based on the modification data.

For simplicity and convenience, a mode of a communication unit of an automated vehicle can be referred to as a mode of the automated vehicle or a mode of a feedback system in the automated vehicle herein. For similar reasons, a bandwidth constraint of the communication unit can be referred to as a bandwidth constraint of the automated vehicle or a bandwidth constraint of the feedback system in the automated vehicle.

Referring to FIG. 1A, depicted is an operating environment 100 for a feedback system 199 according to some embodiments. As depicted, the operating environment 100 includes the following elements: an ego vehicle 123; an ego vehicle's home 110; a remote vehicle 116; a remote vehicle's home 114; a roadside unit 118; and a cloud server 120. These elements are communicatively coupled to one another by a network 105.

Although two vehicles 123 and 116, two vehicles' homes 110 and 114, one cloud server 120, one roadside unit 118 and one network 105 are depicted in FIG. 1A, in practice the operating environment 100 may include any number of vehicles, vehicle's homes, cloud servers 120, roadside units 118 and networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, millimeter wave (mmWave), WiFi (infrastructure mode), WiFi (ad-hoc mode), visible light communication, TV white space communication and satellite communication. The network 105 may also include a mobile data network that may include 3G, 4G, LTE, LTE-V2V, LTE-V2X, LTE-D2D, VoLTE, 5G-LTE or any other mobile data network or combination of mobile data networks. Further, the network 105 may include one or more IEEE 802.11 wireless networks.

The following are endpoints of the network 105: the ego vehicle 123; the remote vehicle 116; the roadside unit 118; and any other endpoints not depicted in the figure. An endpoint is any electronic device that is operable to send and receive data via V2X communications. For example, an endpoint is an electronic device including a communication unit similar to a communication unit 195. In some embodiments, an endpoint is a smart phone, tablet computer, personal computer, or some other processor-based computing device that includes a communication unit. In some embodiments, an endpoint is a DSRC-equipped device that is operable to send and receive DSRC messages.

The ego vehicle 123 and the remote vehicle 116 may include the same or similar elements. The ego vehicle 123 and the remote vehicle 116 may share a connection or association. For example, the ego vehicle 123 and the remote vehicle 116 may share a common manufacturer (e.g., Toyota) and the functionality described herein may only be provided to vehicles sharing this common manufacturer.

The ego vehicle 123 and the remote vehicle 116 may be any type of vehicles. The ego vehicle 123 and the remote vehicle 116 may be the same type of vehicles relative to one another or different types of vehicles relative to one another.

For example, either the ego vehicle 123 or the remote vehicle 116 may include one of the following types of vehicles: a car; a truck; a sports utility vehicle; a bus; a semi-truck; a drone or any other roadway-based conveyance.

In some embodiments, one or more of the ego vehicle 123 and the remote vehicle 116 may include an autonomous vehicle or a semi-autonomous vehicle. For example, one or more of the ego vehicle 123 and the remote vehicle 116 may include an ADAS system 191. The ADAS system 191 may provide some or all of the functionality that provides autonomous functionality.

The National Highway Traffic Safety Administration ("NHTSA") has defined different "levels" of autonomous vehicles, e.g., Level 0, Level 1, Level 2, Level 3, Level 4, and Level 5. If an autonomous vehicle has a higher-level number than another autonomous vehicle (e.g., Level 3 is a higher-level number than Levels 2 or 1), then the autonomous vehicle with a higher-level number offers a greater combination and quantity of autonomous features relative to the vehicle with the lower level number. The different levels of autonomous vehicles are described briefly below.

Level 0: The set of ADAS systems installed in a vehicle have no vehicle control. The set of ADAS systems may issue warnings to the driver of the vehicle. A vehicle which is Level 0 is not an autonomous or semi-autonomous vehicle.

Level 1: The driver must be ready to take driving control of the autonomous vehicle at any time. The set of ADAS systems installed in the autonomous vehicle may provide autonomous features such as one or more of the following: Adaptive Cruise Control ("ACC"); and Parking Assistance with automated steering and Lane Keeping Assistance ("LKA") Type II, in any combination.

Level 2: The driver is obliged to detect objects and events in the roadway environment and respond if the set of ADAS systems installed in the autonomous vehicle fail to respond properly (based on the driver's subjective judgment). The set of ADAS systems installed in the autonomous vehicle executes accelerating, braking, and steering. The set of ADAS systems installed in the autonomous vehicle can deactivate immediately upon takeover by the driver.

Level 3: Within known, limited environments (such as freeways), the driver can safely turn their attention away from driving tasks but must still be prepared to take control of the autonomous vehicle when needed.

Level 4: The set of ADAS systems installed in the autonomous vehicle can control the autonomous vehicle in all but a few environments such as severe weather. The driver must enable the automated system (which is comprised of the set of ADAS systems installed in the vehicle) only when it is safe to do so. When the automated system is enabled, driver attention is not required for the autonomous vehicle to operate safely and consistent with accepted norms.

Level 5: Other than setting the destination and starting the system, no human intervention is required. The automated system can drive to any location where it is legal to drive and make its own decision (which may vary based on the jurisdiction where the vehicle is located).

A highly autonomous vehicle (HAV) is an autonomous vehicle that is Level 3 or higher.

Accordingly, in some embodiments the ego vehicle 123 is one of the following: a Level 1 autonomous vehicle; a Level 2 autonomous vehicle; a Level 3 autonomous vehicle; a Level 4 autonomous vehicle; a Level 5 autonomous vehicle; and an HAV.

In some embodiments, the ego vehicle 123 includes one or more of the following elements: a processor 125; a memory 127; an ADAS system 191; a DSRC-compliant GPS unit 193; a communication unit 195a; a sensor set 197a; and a feedback system 199a. These elements of the ego vehicle 123 may be communicatively coupled to one another via a bus.

In some embodiments, the processor 125 and the memory 127 may be elements of an on-board vehicle computer system (such as computer system 200 described below with reference to FIG. 2). The on-board vehicle computer system may be operable to cause or control the operation of the feedback system 199 of the ego vehicle 123. The on-board vehicle computer system may be operable to access and execute the data stored on the memory 127 to provide the functionality described herein for the feedback system 199 of the ego vehicle 123 or its elements (see, e.g., FIG. 2). The on-board vehicle computer system may be operable to execute the feedback system 199 which causes the on-board vehicle computer system to execute one or more steps of methods 300, 350, 400 and 500 described below with reference to FIGS. 3A-5.

In some embodiments, the processor 125 and the memory 127 may be elements of an on-board unit. The on-board unit includes an electronic control unit (herein "ECU") or an on-board vehicle computer system that may be operable to cause or control the operation of the feedback system 199. The on-board unit may be operable to access and execute the data stored on the memory 127 to provide the functionality described herein for the feedback system 199 or its elements. The on-board unit may be operable to execute the feedback system 199 which causes the on-board unit to execute one or more steps of the methods 300, 350, 400 and 500 described below with reference to FIGS. 3A-5. In some embodiments, the computer system 200 depicted in FIG. 2 is an example of an on-board unit.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The ego vehicle 123 may include one or more processors 125. Other processors, operating systems, sensors, displays, and physical configurations may be possible.

The memory 127 is a non-transitory memory that stores instructions or data that may be accessed and executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. A portion of the memory 127 may be reserved for use as a buffer or virtual random-access memory (virtual RAM). The ego vehicle 123 may include one or more memories 127.

In some embodiments, the memory 127 stores, as digital data, any data described herein. In some embodiments, the memory 127 stores any data that is necessary for the feedback system 199 to provide its functionality.

For example, the memory 127 stores various data including, but not limited to, connectivity data 150, a connectivity data set 152, threshold data 154, ranking data 156, availability data 158, local dynamic map (LDM) data 159, digital data 160, feedback data 161 and modification data 162. In some embodiments, the digital data 160 includes sensor data generated by the ego vehicle 123, as well as sensor data of other vehicles that is transmitted to the ego vehicle 123 via V2X communication when the ego vehicle 123 is in a receiver mode. The connectivity data 150, the connectivity data set 152, the threshold data 154, the ranking data 156, the availability data 158, the LDM data 159, the feedback data 161 and the modification data 162 are described below in more detail.

The communication unit 195a transmits and receives data to and from a network 105 or to another communication channel. In some embodiments, the communication unit 195a may include a DSRC transceiver, a DSRC receiver, a DSRC transmitter and other hardware or software necessary to make the ego vehicle 123 a DSRC-equipped device.

In some embodiments, the communication unit 195a includes a set of communication radios, e.g., V2X radios. The communication unit 195a includes any type of V2X communication antennas for supporting one or more of the following V2X communication protocols: DSRC; mmWave; LTE-V2X; LTE-D2D; 5G-V2X; ITS-G5; ITS-Connect; LPWAN;

visible light communication; television white space; etc.

In some embodiments, the communication unit 195a includes a port for direct physical connection to the network 105 or to another communication channel. For example, the communication unit 195a includes a USB, SD, CAT-5, or similar port for wired communication with the network 105. In some embodiments, the communication unit 195a includes a wireless transceiver for exchanging data with the network 105 or other communication channels using one or more wireless communication methods, including: IEEE 802.11; IEEE 802.16, BLUETOOTH®; EN ISO 14906: 2004 Electronic Fee Collection—Application interface EN 11253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 195a includes a full-duplex coordination system as described in U.S. patent application Ser. No. 14/471,387 filed on Aug. 28, 2014 and entitled "Full-Duplex Coordination System," the entirety of which is incorporated herein by reference.

In some embodiments, the communication unit 195a includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 195a includes a wired port and a wireless transceiver. The communication unit 195a also provides other conventional connections to the network 105 for distribution of files or media objects using standard network protocols including TCP/IP, HTTP, HTTPS, and SMTP, millimeter wave, DSRC, etc.

In some embodiments, the ADAS system 191 is a conventional ADAS system that controls operation of the ego vehicle 123. In some embodiments, the ADAS system 191 may also include any software or hardware included in the ego vehicle 123 that makes the ego vehicle 123 an autonomous vehicle or a semi-autonomous vehicle. The feedback system 199a of the ego vehicle 123 can be an element of the ADAS system 191 or an element of the ECU of the ego vehicle.

Examples of the ADAS system 191 may include one or more of the following elements of the ego vehicle 123: an adaptive cruise control ("ACC") system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; and a wrong-way driving warning system.

In some embodiments, the DSRC-compliant GPS unit 193 includes any hardware and software necessary to make the ego vehicle 123, computer system 200, or the DSRC-compliant GPS unit 193 compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In some embodiments, the DSRC-compliant GPS unit 193 is operable to provide GPS data describing the location of the ego vehicle 123 with lane-level accuracy. For example, the ego vehicle 123 is traveling in a lane of a roadway. Lane-level accuracy means that the location of the ego vehicle 123 is described by the GPS data so accurately that the lane of travel of the ego vehicle 123 within the roadway may be accurately determined based on the GPS data for this ego vehicle 123 as provided by the DSRC-compliant GPS unit 193. In some embodiments, the GPS data is an element of the BSM data or the PSM data.

In some embodiments, the DSRC-compliant GPS unit 193 includes hardware that wirelessly communicates with a GPS satellite to retrieve GPS data that describes the geographic location of the ego vehicle 123 with a precision that is compliant with the DSRC standard. The DSRC standard requires that GPS data be precise enough to infer if two vehicles (one of which is, for example, the ego vehicle 123) are located in adjacent lanes of travel. In some embodiments, the DSRC-compliant GPS unit 193 is operable to identify, monitor and track its two-dimensional position within 1.5 meters of its actual position 68% of the time under an open sky. Since driving lanes are typically no less than 3 meters wide, whenever the two-dimensional error of the GPS data is less than 1.5 meters the feedback system 199 described herein may analyze the GPS data provided by the DSRC-compliant GPS unit 193 and determine what lane the ego vehicle 123 is traveling in based on the relative positions of two or more different vehicles (one of which is, for example, the ego vehicle 123) traveling on the roadway at the same time.

By comparison to the DSRC-compliant GPS unit 193, a conventional GPS unit which is not compliant with the DSRC standard is unable to determine the location of an ego vehicle 123 with lane-level accuracy. For example, a typical roadway lane is approximately 3 meters wide. However, a conventional GPS unit only has an accuracy of plus or minus 10 meters relative to the actual location of the ego vehicle 123. As a result, such conventional GPS units are not sufficiently accurate to identify a lane of travel for an ego vehicle 123 based on GPS data alone; instead, systems having only conventional GPS units must utilize sensors such as cameras to identify the lane of travel of the ego vehicle 123. Identifying a lane of travel of a vehicle is beneficial, for example, because in some embodiments it may enable the feedback system 199 to more accurately identify a location of an ego vehicle 123 including the computer system 200 and traveling in a roadway having multiple lanes of travel.

In some embodiments, the sensor set 197a may include one or more sensors that are operable to measure the physical environment outside of the ego vehicle 123. For example, the sensor set 197a may include one or more sensors that record one or more physical characteristics of the physical environment that is proximate to the ego vehicle 123. The memory 127 may store sensor data that describes the one or more physical characteristics recorded by the sensor set.

In some embodiments, the sensor set 197a of the ego vehicle 123 may include one or more of the following vehicle sensors: a camera; a LIDAR sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

For example, the sensor set 197a may include external cameras, radar, LIDAR or any other sensors that are needed to build an availability message (the availability message is described below with reference to FIG. 2). The sensor set 197a also includes all the sensors needed to provide sensor data to the ADAS system 191 of the ego vehicle 123. The sensor data is digital data that describes one or more sensor measurements and images recorded by the sensors of the sensor set 197a. In some embodiments, the ADAS system 191 of the ego vehicle 123 provides sufficient autonomous features to the ego vehicle 123 to render the ego vehicle 123 an autonomous vehicle. Accordingly, the sensor set 197a generates about 50 GB of sensor data per hour (or more data per hour).

In some embodiments, both the ego vehicle 123 and the remote vehicle 116 include a sensor set. The ego vehicle 123 and the remote vehicle 116 are autonomous vehicles that generate sensor data, and the sensor data can be aggregated by the cloud server 120 and used to determine updates or patches for the software of the ADAS system 191 by an analysis module 194 of the cloud server 120, so as to ensure that: (1) the ADAS system 191 operates in conformance with its design specifications (which is needed to ensure safe operation of the autonomous vehicles); and (2) the ADAS system 191 continues to improve over time (e.g., access to the sensor data of these in-the-field vehicles provides a feedback loop that is used to seed artificial intelligence technologies applied in the vehicles). Besides, the sensor data can be analyzed to help design new and improved versions of the ADAS system 191 which is needed to design future generations of autonomous vehicles.

In some embodiments, the feedback system 199*a* includes software that is operable, when executed by the processor 125, to cause the processor 125 to execute one or more steps of the methods 300, 350, 400 and 500 described below with reference to FIGS. 3A-5. The functionality of the feedback system 199*a* is described in more detail below according to some embodiments.

In some embodiments, the feedback system 199*a* is implemented using hardware including a field-programmable gate array ("FPGA") or an application-specific integrated circuit ("ASIC"). In some other embodiments, the feedback system 199*a* is implemented using a combination of hardware and software.

The ego vehicle's home 110 refers to a residence of an owner/operator of the ego vehicle 123. The ego vehicle's home 110 may include a router 112*a* that provides a home wireless network for accessing the Internet. The router 112*a* is a networking device that forwards data between computer networks.

The communication unit 195*a* of the ego vehicle 123 needs to be able to access this home wireless network in order to transmit its digital data to the cloud server 120. In some embodiments, the communication unit 195*a* of the ego vehicle 123 may connect to the router 112*a* via a home wireless network when the communication unit 195*a* has no bandwidth constraint that prevents it from sending digital data to the router 112*a* for uploading to the cloud server 120. For example, when the communication unit 195*a* has sufficiently good access to the home wireless network via the router 112*a*, the communication unit 195*a* of the ego vehicle 123 can send digital data to the router 112*a*, causing the router 112*a* to forward the digital data to the cloud server 120.

However, the access to the home wireless network is not possible if, for example: (1) the ego vehicle 123 is parked too far away from the router 112*a*, parked in a garage with walls that block wireless communication with the router 112*a* or parked underground; or (2) the owner/operator of the ego vehicle 123 has never inputted a password of the home wireless network to the ego vehicle's onboard system. In these cases, the communication unit 195*a* of the ego vehicle 123 has a bandwidth constraint that prevents it from sending digital data to the router 112*a* for uploading to the cloud server 120 (e.g., the communication unit 195*a* has poor or no access to the home wireless network), and therefore the communication unit 195*a* may not send any digital data to the router 112*a* under this circumstance.

In some embodiments, the bandwidth constraint of the communication unit 195*a* describes that the communication unit 195*a* of the ego vehicle 123 has insufficient bandwidth (e.g., no bandwidth or very limited bandwidth) to upload data to the cloud server 120 via a communication device (such as the router 112*a*). For example, the bandwidth constraint is caused by a factor selected from a group that consists of the following: the router 112*a* does not exist or malfunctions; the communication unit 195*a* cannot wirelessly communicate with the router 112*a*; the router 112*a* is outside of a transmission range of the communication unit 195*a*; the router 112*a* has poor access to a wireless network or the network 105; the router 112*a* does not have access to the wireless network or the network 105; and the communication unit 195*a* does not store a password for the router 112*a* so that the communication unit 195*a* is not authenticated to wirelessly communicate with the router 112*a*.

In some embodiments, the remote vehicle 116 may have elements similar to those of the ego vehicle 123. For example, the remote vehicle 116 includes a feedback system 199*b*, a sensor set 197*b* and a communication unit 195*b*. It is possible that the remote vehicle 116 may have elements different from the ego vehicle 123.

In some embodiments, the remote vehicle's home 114 may have elements similar to those of the ego vehicle's home 110. For example, the remote vehicle's home 114 includes a router 112*b*.

In some embodiments, the communication unit 195*b* of the remote vehicle 116 may connect to the router 112*b* via a home wireless network when the communication unit 195*b* has no bandwidth constraint that prevents it from sending digital data to the router 112*b* for uploading to the cloud server 120. For example, when the communication unit 195*b* has sufficiently good access to the home wireless network via the router 112*b*, the communication unit 195*b* of the remote vehicle 116 can send digital data to the router 112*b*, causing the router 112*b* to forward the digital data to the cloud server 120.

However, in some embodiments, when the communication unit 195*b* has a bandwidth constraint that prevents it from sending digital data to the router 112*b* for uploading to the cloud server 120 (e.g., the communication unit 195*b* has poor or no access to the home wireless network), the communication unit 195*b* may not send any digital data to the router 112*b* under this circumstance.

In some embodiments, the roadside unit 118 is a DSRC device configured on a roadway. The roadside unit 118 may communicate with the cloud server 120 via an infrastructure network connection. One or more of the ego vehicle 123 and the remote vehicle 116 may communicate with the roadside unit 118 using vehicle-to-infrastructure (V2I) communication, where the V2I communication is an example of the V2X communication. As depicted in FIG. 1, the roadside unit 118 includes a feedback system 199*c* and a communication unit 195*c*.

In some embodiments, the cloud server 120 is a computing device that includes one or more processors (not depicted in the figure) and one or more memories (not depicted in the figure). For example, the cloud server 120 is a hardware server that aggregates and analyzes sensor data generated by various vehicles including the ego vehicle 123 and the remote vehicle 116.

As depicted in FIG. 1, the cloud server 120 includes a feedback system 199*d*, a sensor data set 122, a communication unit 195*d* and an analysis module 194.

The feedback system 199*d* of the cloud server 120 can be a modified or simplified version of the feedback systems 199*a*-199*c*. The feedback system 199*d* receives various sensor data measured by various vehicles and builds the sensor data set 122. In some embodiments, the feedback system 199*d* of the cloud server 120 receives the various sensor data uploaded from one or more of the roadside unit 118, the router 112*a* and the router 112*b*, and aggregates the various sensor data in the sensor data set 122. The various sensor data is generated by a variety of automated vehicles. In some embodiments, the feedback system 199*d* of the cloud server 120 generates ranking data as described below with reference to FIG. 2.

The sensor data set 122 can be a data structure that stores sensor data generated by various vehicles including the ego vehicle 123 and the remote vehicle 116.

The analysis module 194 can be a set of instructions executable by a processor of the cloud server 120 to provide the functionality described below for analyzing sensor data that is successfully received by the cloud server 120. In some embodiments, the analysis module 194 can be stored in a memory of the cloud server 120 and can be accessible and executable by the processor of the cloud server 120.

In some embodiments, the analysis module 194 is operable to retrieve sensor data from the sensor data set 122 and perform analysis on the sensor data. For example, the analysis module 194 analyzes various sensor data generated by various automated vehicles (including the ego vehicle 123 and the remote vehicle 116) and identifies patterns of autonomous driving behaviors of the automated vehicles.

In another example, the analysis module 194 analyzes the aggregated sensor data to determine updates or patches for the software of the ADAS system 191, where the updates or patches for the software of the ADAS system 191 can ensure that: (1) the ADAS system 191 operates in conformance with its design specifications (which is needed to ensure safe operation of the autonomous vehicles); and (2) the ADAS system 191 continues to improve over time (e.g., access to the sensor data of these in-the-field vehicles provides a feedback loop that is used to seed artificial intelligence technologies applied in the vehicles). Besides, the analysis module 194 analyzes the sensor data to provide guidance to the design of new and improved versions of the ADAS system 191 which is needed to design future generations of autonomous vehicles.

In some embodiments, the analysis module 194 analyzes sensor data that is generated by a particular automated vehicle (or generated by various automated vehicles) and generates modification data for the particular automated vehicle based on the sensor data. The modification data may cause a modification of a vehicle component when received by the automated vehicle. For example, the analysis module 194 can generate modification data that helps the ADAS system 191 to improve safety and efficiency of the ego vehicle 123.

A real-time example process for improving safety of the ego vehicle 123 with the aid of analysis of the sensor data by the cloud server 120 is described in more detail below with reference to FIG. 2.

For simplicity and convenience of description, the feedback system 199*a* of the ego vehicle 123, the feedback system 199*b* of the remote vehicle 116, the feedback system 199*c* of the roadside unit 118 and the feedback system 199*d* of the cloud server 120 may be referred to herein collectively or individually as the "feedback system 199" since, for example, the feedback system 199*a* of the ego vehicle 123 provides similar functionality to the components of the ego vehicle 123 as does the feedback system 199*b* of the remote vehicle 116, the feedback system 199*c* of the roadside unit 118 or the feedback system 199*d* of the cloud server 120. For similar reasons, the description provided herein uses the following terms when referring to elements that are common to the ego vehicle 123, the ego vehicle's home 110, the remote vehicle 116, the remote vehicle's home 114, the roadside unit 118 and the cloud server 120 and that provide similar functionality to the ego vehicle 123, the ego vehicle's home 110, the remote vehicle 116, the remote vehicle's home 114, the roadside unit 118 and the cloud server 120: the "communication unit 195" when referring to the communication units 195*a*-195*d*, collectively or individually; the "sensor set 197" when referring to the sensor set 197*a* and the sensor set 197*b*, collectively or individually; and the "router 112" when referring to the router 112*a* and the router 112*b*, collectively or individually.

Example Computer System

Figure 2:
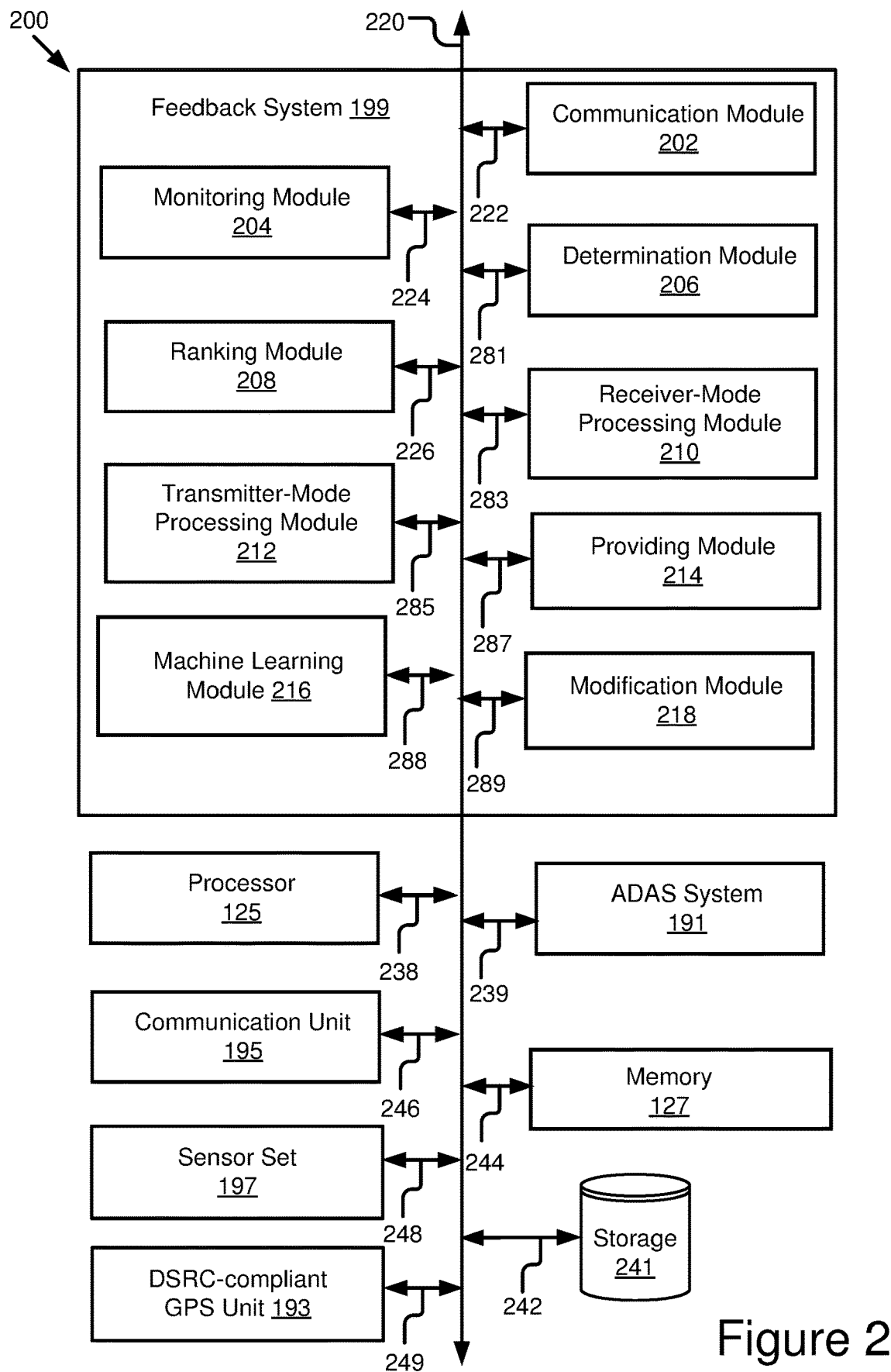
FIG. 2 is a block diagram illustrating an example computer system including a feedback system according to some embodiments.

Referring now to FIG. 2, depicted is a block diagram illustrating an example computer system 200 including the feedback system 199 according to some embodiments. In some embodiments, the computer system 200 may include a special-purpose computer system that is programmed to perform one or more steps of the methods 300, 350, 400 and 500 described below with reference to FIGS. 3A-5. In some embodiments, the computer system 200 is an on-board vehicle computer of the ego vehicle 123. In some embodiments, the computer system 200 is an on-board unit of the ego vehicle 123. In some embodiments, the computer system 200 is an electronic control unit (ECU), head unit or some other processor-based computing device of the ego vehicle 123.

The computer system 200 includes one or more of the following elements according to some examples: the feedback system 199; the processor 125; the communication unit 195; the memory 127; the ADAS system 191; the sensor set 197; the DSRC-compliant GPS unit 193; and a storage 241. The components of the computer system 200 are communicatively coupled by a bus 220.

In the illustrated embodiment, the processor 125 is communicatively coupled to the bus 220 via a signal line 238. The ADAS system 191 is communicatively coupled to the bus 220 via a signal line 239. The communication unit 195 is communicatively coupled to the bus 220 via a signal line 246. The memory 127 is communicatively coupled to the bus 220 via a signal line 244. The sensor set 197 is communicatively coupled to the bus 220 via a signal line 248. The storage 241 is communicatively coupled to the bus 220 via a signal line 242. The DSRC-compliant GPS unit 193 is communicatively coupled to the bus 220 via a signal line 249.

The storage 241 is a non-transitory memory that stores instructions or data that may be accessed and executed by the processor 125. The instructions or data may include code for performing the techniques described herein. The storage 241 may be a dynamic random-access memory (DRAM) device, a static random-access memory (SRAM) device, flash memory, or some other memory device. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the storage 241 may store any of the data described above with reference to FIG. 1 or below with reference to FIGS. 2-7. The storage 241 may store any data needed for the computer system 200 to provide its functionality.

In the illustrated embodiment shown in FIG. 2, the feedback system 199 includes: a communication module 202; a monitoring module 204; a determination module 206; a ranking module 208; a receiver-mode processing module 210; a transmitter-mode processing module 212; a providing module 214; a machine learning module 216; and a modification module 218.

The communication module 202 can be software including routines for handling communications between the feedback system 199 and other components of the operating environment 100 of FIG. 1.

In some embodiments, the communication module 202 can be a set of instructions executable by the processor 125 to provide the functionality described below for handling communications between the feedback system 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via signal line 222.

The communication module 202 sends and receives data, via the communication unit 195, to and from one or more elements of the operating environment 100. For example, the communication module 202 receives or transmits, via the communication unit 195, some or all of the digital data stored on the memory 127. The communication module 202 may send or receive any of the digital data or messages described above with reference to FIG. 1, or below with reference to FIGS. 2-7, via the communication unit 195.

In some embodiments, the communication module 202 receives data from components of the feedback system 199 and stores the data in the memory 127 (or a buffer or cache of the memory 127, or a standalone buffer or cache which is not depicted in FIG. 2). For example, the communication module 202 receives the sensor data from the communication unit 195 and stores the sensor data in the memory 127.

In some embodiments, the communication module 202 may handle communications between components of the feedback system 199. For example, the communication module 202 transmits the ranking data 156 from the ranking module 208 to the receiver-mode processing module 210.

In some embodiments, the monitoring module 204 can be a set of instructions executable by the processor 125 which are operable, when executed by the processor 125, to cause the processor 125 to monitor for a connectivity access of an ego vehicle 123. In some embodiments, the monitoring module 204 can be stored in the memory 127 of the computer system 200 and can be accessible and executable by the processor 125. The monitoring module 204 may be adapted for cooperation and communication with the processor 125 and other components of the computer system 200 via a signal line 224.

In some embodiments, the monitoring module 204 is operable to monitor for a connectivity access of the communication unit 195 of the ego vehicle 123 that accesses a network provided by a communication device (e.g., a home wireless network provided by the router 112). The connectivity access, for example, describes one or more network patterns of the network provided by the communication device. For example, the monitoring module 204 monitors for network patterns indicating one or more of the following: how frequently the communication unit 195 of the ego vehicle 123 is connected to the network; how long the communication unit 195 of the ego vehicle 123 is connected to the network; a data transfer rate of the network to the cloud server 120 when the communication unit 195 of the ego vehicle 123 is connected to the network; and how much data the communication unit 195 of the ego vehicle 123 can transfer, on average, to the network during a given time interval (e.g., one day, one night, one hour, etc.).

The monitoring module 204 is operable to generate connectivity data describing the connectivity access. For example, the monitoring module 204 generates connectivity data describing one or more of the following: the communication unit 195 of the ego vehicle 123 is connected to the network for at least 8 hours every day from 12:00 AM to 8:00 AM; a data transfer rate of the network to the cloud server 120 is at least 10 Mb/s when the communication unit 195 of the ego vehicle 123 is connected to the network; and the communication unit 195 of the ego vehicle 123 can transfer, on average, 500 GB to the network during one day.

In some embodiments, the determination module 206 can be a set of instructions executable by the processor 125 which are operable, when executed by the processor 125, to cause the processor 125 to determine a mode of the communication unit 195 of the ego vehicle 123. In some embodiments, the determination module 206 can be stored in the memory 127 of the computer system 200 and can be accessible and executable by the processor 125. The determination module 206 may be adapted for cooperation and communication with the processor 125 and other components of the computer system 200 via a signal line 281.

In some embodiments, the determination module 206 is operable to compare the connectivity access of the communication unit 195 of the ego vehicle 123 with a connectivity threshold to determine whether the connectivity threshold is satisfied by the connectivity access.

The connectivity threshold is described by threshold data stored in the memory 127. For example, the threshold data is digital data that describes the connectivity threshold for the ego vehicle's connectivity access. In some embodiments, the threshold data describes one or more conditions that the communication unit 195 of the ego vehicle 123 needs to satisfy. If the one or more conditions are satisfied, then the communication unit 195 can be considered as having no bandwidth constraint that prevents it from relaying sensor data of other vehicles to the cloud server 120; however, if the one or more conditions are not satisfied, then the communication unit 195 can be considered as having a bandwidth constraint that prevents it from relaying sensor data of other vehicles to the cloud server 120. For example, the threshold data describes that: (1) a threshold data transfer rate of the network to the cloud server 120 is 10 Mb/s when the communication unit 195 of the ego vehicle 123 is connected to the network; and (2) a threshold data amount being transferred per day by the communication unit 195 of the ego vehicle 123 to the network is 200 GB.

If the connectivity threshold is satisfied by the connectivity access, then the determination module 206 determines that the communication unit 195 of the ego vehicle 123 has no bandwidth constraint that prevents it from relaying sensor data of other vehicles to the cloud server 120. The determination module 206 configures the communication unit 195 of the ego vehicle 123 to enter a receiver mode. During the receiver mode, sensor data generated by a remote vehicle having a bandwidth constraint can be relayed to the ego vehicle 123 and included in digital data of the ego vehicle 123. The digital data of the ego vehicle 123 also includes sensor data generated by the ego vehicle 123 itself. The digital data is uploaded to the cloud server by providing the digital data to the communication device (e.g., the router 112) via the communication unit 195 of the ego vehicle 123. Details of the receiver mode are described below with reference to the receiver-mode processing module 210.

For example, assume that the connectivity threshold describes that: (1) a threshold data transfer rate of a network to the cloud server 120 is 10 Mb/s when the communication unit 195 of the ego vehicle 123 is connected to the network; and (2) a threshold connection duration is six (6) hours per day on average. If the connectivity access of the ego vehicle 123 describes that (1) a data transfer rate of the network to the cloud server 120 is at least 10 Mb/s when the communication unit 195 of the ego vehicle 123 is connected to the network and (2) the communication unit 195 of the ego vehicle 123 is connected to the network for at least eight (8) hours every day, then the connection threshold is satisfied by the connectivity access of the ego vehicle 123. The determination module 206 determines that the communication unit 195 of the ego vehicle 123 has sufficiently good access to the network via the communication device (e.g., the router 112) so as to relay sensor data of other vehicles to the network, and then the communication unit 195 of the ego vehicle 123 enters a receiver mode.

However, if the connectivity threshold is not satisfied by the connectivity access, then the determination module 206 determines that the communication unit 195 of the ego vehicle 123 has a bandwidth constraint that prevents it from relaying sensor data of other vehicles to the cloud server 120. The determination module 206 configures the communication unit 195 of the ego vehicle 123 to enter a transmitter mode. During the transmitter mode, sensor data generated by the ego vehicle 123 is relayed to a partner endpoint of the ego vehicle 123 and is included in digital data of the partner endpoint for uploading to the cloud server via the partner endpoint. Details of the transmitter mode are described below with reference to the transmitter-mode processing module 212.

For example, assume that the connectivity threshold describes that: (1) a threshold data transfer rate of a network to the cloud server 120 is 10 Mb/s when the communication unit 195 of the ego vehicle 123 is connected to the network; and (2) a threshold connection duration is 6 hours per day on average. If the connectivity access of the ego vehicle 123 describes that (1) a data transfer rate of the network to the cloud server 120 is 2 Mb/s or less when the communication unit 195 of the ego vehicle 123 is connected to the network and (2) the communication unit 195 of the ego vehicle 123 is connected to the network for at least 6 hours every day, then the connection threshold is not satisfied by the connectivity access of the ego vehicle 123 because the data transfer rate of the network is smaller than the threshold data transfer rate. The determination module 206 determines that the communication unit 195 of the ego vehicle 123 does not have sufficiently good access to the network via the communication device (e.g., the router 112), and then the communication unit 195 of the ego vehicle 123 enters a transmitter mode.

In some embodiments, the ranking module 208 can be a set of instructions executable by the processor 125 which are operable, when executed by the processor 125, to cause the processor 125 to determine an access ranking of the communication unit 195 of the ego vehicle 123. In some embodiments, the ranking module 208 can be stored in the memory 127 of the computer system 200 and can be accessible and executable by the processor 125. The ranking module 208 may be adapted for cooperation and communication with the processor 125 and other components of the computer system 200 via a signal line 226.

In some embodiments, the ranking module 208 is operable to receive connectivity data of one or more other endpoints (including one or more of the remote vehicle 116, the roadside unit 118 and other endpoints), generate a connectivity data set that includes the connectivity data of the ego vehicle 123 and the connectivity data of the one or more other endpoints, and generate ranking data that describes an access ranking of the ego vehicle 123 based on the connectivity data set. The ranking data is digital data describing an access ranking of the communication unit 195 of the ego vehicle 123 relative to the other endpoints. The access ranking of the communication unit 195 may be an indicator indicating quality of access of the communication unit 195 to a network provided by a communication device (e.g., the router 112).

In some embodiments, the ranking data may also describe access rankings of the one or more other endpoints. For example, the ranking module 208 may generate ranking data describing the access ranking of the communication unit 195 of the ego vehicle 123 as well as the access rankings of the communication units 195 of the other endpoints. In a further example, the ranking module 208 compares the ego vehicle's network patterns to network patterns of the other endpoints (e.g., the ranking module 208 compares the relative network access speeds, quality, and usage patterns among the ego vehicle 123 and the other endpoints) to determine access rankings for the ego vehicle 123 and the other endpoints.

In some embodiments, the ranking data may be generated locally by the ranking module 208 of the ego vehicle 123. For example, the ranking module 208 receives connectivity data describing connectivity access of the other endpoints via V2X communications exchanged with these other endpoints. The ranking module 208 generates a connectivity data set that includes connectivity data generated by the ego vehicle 123 locally and the connectivity data received from the other endpoints. The ranking module 208 analyzes the connectivity data set and generates the ranking data. The ranking module 208 may forward the generated ranking data to each of the other endpoints as well as the cloud server 120.

In some other embodiments, the ranking data may be generated remotely by the feedback system 199 of the cloud server 120. The feedback system 199 of the cloud server 120 receives first connectivity data from the ego vehicle 123 and second connectivity data from one or more other endpoints via a network (e.g., WiFi, LTE, or some other wireless network). The feedback system 199 of the cloud server 120 builds a connectivity data set using the first connectivity data received from the ego vehicle 123 and the second connectivity data received from the other endpoints. The feedback system 199 of the cloud server 120 analyzes the connectivity data set and generates ranking data describing access rankings of the ego vehicle 123 and the other endpoints. In some embodiments, the feedback system 199 of the cloud server 120 forwards the ranking data describing all access rankings of the ego vehicle 123 and the other endpoints to each of the ego vehicle 123 and the other endpoints. In some other embodiments, the feedback system 199 of the cloud server 120 only forwards a particular instance of the ranking data that describes an access ranking of a particular endpoint to that endpoint. The particular instance of ranking data received by the particular endpoint from the cloud server 120 describes the access ranking for that endpoint. The feedback system 199 of the cloud server 120 distributes various instances of the ranking data to the various endpoints via the network 105, respectively.

In some embodiments, the receiver-mode processing module 210 can be a set of instructions executable by the processor 125 which are operable, when executed by the processor 125, to cause the processor 125 to perform operations in a receiver mode. In some embodiments, the receiver-mode processing module 210 can be stored in the memory 127 of the computer system 200 and can be accessible and executable by the processor 125. The receiver-mode processing module 210 may be adapted for cooperation and communication with the processor 125 and other components of the computer system 200 via a signal line 283.

In some embodiments, during a receiver mode of the communication unit 195 of the ego vehicle 123, the feedback system 199 of the ego vehicle 123 and the feedback system 199 of the remote vehicle 116 whose communication unit is in a transmitter mode cooperate with each other to execute one or more of the following procedures (a)-(i), where procedures (a), (b), (h), and (i) are executed by the feedback system 199 of the ego vehicle 123 in the receiver mode, and procedures (c), (d), (e), (f), and (g) are executed by the feedback system 199 of the remote vehicle 116 in the transmitter mode.

Procedure (a): The receiver-mode processing module 210 of the ego vehicle 123 generates a wireless message that includes availability data. The wireless message can be a V2X message or any type of wireless messages for unlicensed band communications (e.g., a wireless message from WiFi, LTE-U, LTE-LAA, etc.). For example, the wireless message can be a message that complies with any type of wireless communication protocols described with reference to the network 105 or the communication unit 195. The wireless message including the availability data is referred to as an "availability message."

The availability data of the ego vehicle 123 is digital data describing one or more of the following: (1) an indicator indicating that the ego vehicle 123 (or the communication unit 195 of the ego vehicle 123) is in the receiver mode; (2) the access ranking of the ego vehicle 123; (3) a geographic location of the ego vehicle 123; (4) a future estimated path of the ego vehicle 123; (5) a speed of the ego vehicle 123; (6) a heading of the ego vehicle 123; (7) capacity data describing a current available memory capacity (e.g., in bytes) of the ego vehicle 123 for storing sensor data received from other vehicles; (8) one or more forms of V2X communication supported by the ego vehicle 123 (e.g., DSRC, mmWave, LTE-V2X, LTE-D2D, 5G-V2X, ITS-G5, ITS-Connect, LPWAN, visible light communication, etc.); and (9) a current transmission rate that can be achieved for each of these forms of V2X communication. Different forms of V2X communication may have different transmission ranges, data rates and line of sight requirements, and so, different vehicles may select to communicate with the ego vehicle 123 using different forms of V2X communication in different contexts.

Procedure (b): The receiver-mode processing module 210 of the ego vehicle 123 transmits the availability message via a form of V2X communication supported by the ego vehicle 123. For example, the receiver-mode processing module 210 of the ego vehicle 123 uses DSRC or any other form of V2X communication to broadcast the availability message so that the remote vehicle 116 as well as other vehicles within a communication range of the ego vehicle 123 can receive the availability message of the ego vehicle 123. Transmission of the availability message is a first step in a handshake process with the remote vehicle 116.

Procedure (c): The transmitter-mode processing module 212 of the remote vehicle 116, which is in the transmitter mode, receives the availability message from the ego vehicle 123, as well as other availability messages from one or more other endpoints.

Procedure (d): The transmitter-mode processing module 212 of the remote vehicle 116 generates availability data of the remote vehicle 116. The availability data of the remote vehicle 116 is similar to that of the ego vehicle 123, and similar description is not repeated here.

Procedure (e): The transmitter-mode processing module 212 of the remote vehicle 116 generates a local dynamic map (LDM) that describes a first geographic location of the ego vehicle 123, one or more second geographic locations of the one or more other endpoints and a third geographic location of the remote vehicle 116 on a map. For example, the transmitter-mode processing module 212 of the remote vehicle 116 generates LDM data describing the local dynamic map based on the availability data of the remote vehicle 116 generated at procedure (d) and the availability data of the one or more other endpoints and the ego vehicle 123 received at procedure (c).

The local dynamic map describes a geographic location for each endpoint on a map, thereby forming endpoint-geolocation pairs on the map. For example, the transmitter-mode processing module 212 of the remote vehicle 116 forms endpoint-geolocation pairs on the local dynamic map by mapping the ego vehicle 123 to the first geographic location of the ego vehicle 123, mapping the one or more other endpoints to the one or more second geographic locations of the one or more other endpoints, and mapping the remote vehicle 116 to the third geographic location of the remote vehicle 116.

A particular vehicle or roadside unit and a corresponding geographic location thereof form an endpoint-geolocation pair. For each of the endpoint-geolocation pairs that includes a corresponding endpoint and a geographic location of the endpoint, the local dynamic map includes one or more of the following endpoint information: (1) an access ranking of the endpoint; (2) a predicted future path of the endpoint; (3) a speed of the endpoint; (4) a heading of the endpoint; (5) capacity data describing an available memory capacity of the endpoint (e.g., in bytes); (6) one or more forms of V2X communication supported by the endpoint (e.g., DSRC, mmWave, LTE-V2X, LTE-D2D, 5G-V2X, ITS-G5, ITS-Connect, LPWAN, visible light communication, etc.); and (7) a corresponding transmission rate achieved for each of the one or more forms of V2X communication. If the endpoint is a roadside unit, a predicted future path, a speed and a heading of the endpoint are all "zeros" or "null," and the one or more forms of V2X communication are one or more forms of vehicle-to-infrastructure (V2I) communication.

Procedure (f): The transmitter-mode processing module 212 of the remote vehicle 116 performs the following operations: (1) retrieving ranking data that describes one or more access rankings of the one or more other endpoints as well as an access ranking of the ego vehicle 123 from the availability data received at procedure (c); and (2) identifying a partner endpoint of the remote vehicle 116 from the one or more other endpoints and the ego vehicle 123 based on the local dynamic map generated at procedure (e), the ranking data of the one or more other endpoints, and the ranking data of the ego vehicle 123.

In some embodiments, the remote vehicle 116 stores sensor data that needs to be transmitted to the cloud server 120 for analysis. Since the remote vehicle 116 is in the transmitter mode, it needs to identify another endpoint to help it relay its sensor data to the cloud server 120. The transmitter-mode processing module 212 of the remote vehicle 116 analyzes the LDM data to determine which of the endpoints included in the LDM to use as a partner endpoint based in part on the context of the remote vehicle 116 relative to the other endpoints, so that the partner endpoint can relay the sensor data of the remote vehicle 116 to the cloud server 120.

The transmitter-mode processing module 212 of the remote vehicle 116 selects the partner endpoint of the remote vehicle 116 based on various factors including endpoint information of each endpoint-geolocation pair described above. An endpoint selected as the partner endpoint of the remote vehicle 116 may not necessarily be an endpoint included in the LDM having the highest access ranking. For example, a vehicle having the highest ranking with mmWave communication capability may be an ideal partner endpoint (due to mmWave's high transmission rate of 100 Mb/s to 1 Gb/s). However, this may not be possible, for example, if there is not clear line of sight between the remote vehicle 116 and the vehicle having the highest ranking (mmWave has a strict line of sight requirement). In another example, a candidate vehicle may seem like a potential partner endpoint, but it does not have enough memory capacity to store the remote vehicle's sensor data. Thus, this candidate vehicle cannot be selected to act as the partner endpoint of the remote vehicle 116. In yet another example, a candidate vehicle may seem like a potential partner endpoint, but its path of travel may be in a different direction so that the remote vehicle 116 cannot offload a minimal required amount of its sensor data to the candidate vehicle before they are outside of transmission range of one another. The minimal required amount of sensor data to be offloaded is described below in more detail.

In some embodiments, the transmitter-mode processing module 212 of the remote vehicle 116 analyzes the LDM to identify the partner endpoint of the remote vehicle 116 from the LDM. For example, the transmitter-mode processing module 212 of the remote vehicle 116 analyzes the LDM to determine a series of candidate endpoints each having a context that leads to an offload likelihood to be greater than a threshold. The offload likelihood of a candidate endpoint is a likelihood that the remote vehicle 116 can be able to successfully transmit at least a minimal required amount of its sensor data to the candidate endpoint before their paths of travel deviate or other circumstances occur that would interfere with their ability to communicate with one another via V2X. The transmitter-mode processing module 212 of the remote vehicle 116 selects a candidate endpoint with a highest access ranking from the series of candidate endpoints as the partner endpoint of the remote vehicle 116.

The minimal required amount of the sensor data to be offloaded from the remote vehicle 116 to a candidate endpoint can be a minimal amount of the sensor data intended to be offloaded from the remote vehicle 116 to the candidate endpoint. For example, the minimal required amount of the sensor data to be offloaded can be 20%, 50%, 70% or even 100% of the entire sensor data that needs to be offloaded from the remote vehicle 116. In some embodiments, when the remote vehicle 116 travels from a first location to a second location, the remote vehicle 116 can select multiple partner endpoints subsequently or simultaneously along its travel path to offload its entire sensor data to the multiple partner endpoints. In this case, only a certain percentage of its sensor data is offloaded to each of the multiple partner endpoints. However, the certain percentage of its sensor data offloaded to each partner endpoint is no less than the minimal required amount of sensor data.

Procedure (g): The transmitter-mode processing module 212 of the remote vehicle 116 wirelessly communicates via a selected V2X channel with the partner endpoint to offload its sensor data to the partner endpoint. Without loss of generality, assume that the ego vehicle 123 in the receiver mode is identified as the partner endpoint of the remote vehicle 116. The selected V2X is a V2X channel that is supported by both endpoints (the ego vehicle 123 and the remote vehicle 116) and is a best fit for this communication given a distance separating the two endpoints, whether obstructions are present between the two endpoints, speeds of the two endpoints, headings of the two endpoints, and future paths of travel of the two endpoints.

Procedure (h): The providing module 214 of the ego vehicle 123 (i.e., the partner endpoint of the remote vehicle 116) receives a V2X message including the sensor data of the remote vehicle 116 from the remote vehicle 116 and stores the sensor data in the memory 127 or the storage 241 of the ego vehicle 123.

Procedure (i): The providing module 214 of the ego vehicle 123 waits for the communication unit 195 of the ego vehicle 123 to be connected to a network (e.g., a home wireless network) via the communication device again. When the communication unit 195 of the ego vehicle 123 is reconnected to the network via the communication device, the providing module 214 of the ego vehicle 123 includes sensor data of the ego vehicle 123 as well as the sensor data of the remote vehicle 116 into its digital data and uploads the digital data to the cloud server 120 using the communication device (e.g., a home router).

In some embodiments, the transmitter-mode processing module 212 can be a set of instructions executable by the processor 125 which are operable, when executed by the processor 125, to cause the processor 125 to perform operations in a transmitter mode. In some embodiments, the transmitter-mode processing module 212 can be stored in the memory 127 of the computer system 200 and can be accessible and executable by the processor 125. The transmitter-mode processing module 212 may be adapted for cooperation and communication with the processor 125 and other components of the computer system 200 via a signal line 285.

In some embodiments, during a transmitter mode of the communication unit 195 of the ego vehicle 123, the feedback system 199 of the ego vehicle 123 and the feedback system 199 of a partner endpoint of the ego vehicle 123 in the receiver mode cooperate with each other to execute one or more of the following procedures (I)-(VIIII), where procedures (I)-(VII) are executed by the feedback system 199 of the ego vehicle 123 in the transmitter mode, and procedures (VIII) and (VIIII) are executed by the feedback system 199 of the partner endpoint in the receiver mode. The partner endpoint of the ego vehicle 123 can be the remote vehicle 116, the roadside unit 118 or another appropriate endpoint.

Procedure (I): The transmitter-mode processing module 212 of the ego vehicle 123 monitors for availability messages from one or more endpoints including one or more of the remote vehicle 116 and the roadside unit 118.

Procedure (II): The transmitter-mode processing module 212 of the ego vehicle 123 receives one or more availability messages via V2X communication from the one or more endpoints.

Procedure (III): The transmitter-mode processing module 212 of the ego vehicle 123 generates its own availability data describing its own availability message.

Procedure (IIII): The transmitter-mode processing module 212 of the ego vehicle 123 decodes availability data of the one or more endpoints from the one or more availability messages received at procedure (II).

Procedure (V): The transmitter-mode processing module 212 of the ego vehicle 123 generates a local dynamic map that describes a first geographic location of the ego vehicle 123 and one or more second geographic locations of the one or more endpoints on a map. For example, the transmitter-mode processing module 212 of the ego vehicle 123 generates LDM data describing the local dynamic map based on the availability data of the ego vehicle 123 generated at procedure (III) and the availability data of the one or more endpoints decoded at procedure (IIII).

For example, the transmitter-mode processing module 212 of the ego vehicle 123 forms endpoint-geolocation pairs on the local dynamic map. For each of the endpoint-geolocation pairs that includes a corresponding endpoint and a geographic location of the corresponding endpoint, the local dynamic map includes one or more of the following endpoint information: (1) an access ranking of the endpoint; (2) a predicted future path of the endpoint; (3) a speed of the endpoint; (4) a heading of the endpoint; (5) capacity data describing an available memory capacity of the endpoint (e.g., in bytes); (6) one or more forms of V2X communication supported by the endpoint; and (7) a corresponding transmission rate achieved for each of the one or more forms of V2X communication.

Operations similar to those described above in procedure (e) can be performed to generate the local dynamic map on the ego vehicle 123, and similar description will not be repeated here.

Procedure (VI): The transmitter-mode processing module 212 of the ego vehicle 123 performs the following operations: (1) retrieving ranking data that describes one or more access rankings of the one or more endpoints from the availability data decoded at procedure (IIII), as well as ranking data describing an access ranking of the ego vehicle 123 from the availability data generated at procedure (III); and (2) identifying a partner endpoint of the ego vehicle 123 from the one or more endpoints based on the local dynamic map generated at procedure (V) and the ranking data of the one or more endpoints.

In some embodiments, the ego vehicle 123 stores sensor data that needs to be transmitted to the cloud server 120 for analysis. Since the ego vehicle 123 is in the transmitter mode, it needs to identify another endpoint to help it relay its sensor data to the cloud server 120. The transmitter-mode processing module 212 of the ego vehicle 123 analyzes the LDM data to determine which of the endpoints included in the local dynamic map to use as a partner endpoint based in part on the context of the ego vehicle 123 relative to the other endpoints, so that the partner endpoint can relay the sensor data of the ego vehicle 123 to the cloud server 120.

The transmitter-mode processing module 212 of the ego vehicle 123 selects the partner endpoint of the remote vehicle 116 based on various factors including endpoint information of each endpoint-geolocation pair described above. An endpoint selected as the partner endpoint of the ego vehicle 123 may not necessarily be an endpoint included in the local dynamic map having the highest access ranking. For example, a vehicle having the highest ranking with mmWave communication capability may be an ideal partner endpoint (due to mmWave's high transmission rate of 100 Mb/s to 1 Gb/s). However, this may not be possible, for example, if there is not clear line of sight between the ego vehicle 123 and the vehicle having the highest ranking (mmWave has a strict line of sight requirement).

In some embodiments, the transmitter-mode processing module 212 of the ego vehicle 123 analyzes the local dynamic map to identify the partner endpoint of the ego vehicle 123 from the local dynamic map. For example, the transmitter-mode processing module 212 of the ego vehicle 123 analyzes the local dynamic map to determine a series of candidate endpoints each having a context that leads to an offload likelihood to be greater than a threshold. The offload likelihood of a candidate endpoint is a likelihood that the ego vehicle 123 can be able to successfully transmit at least a minimal required amount of its sensor data to the candidate endpoint before their paths of travel deviate or other circumstances occur that would interfere with their ability to communicate with one another via V2X. The transmitter-mode processing module 212 of the ego vehicle 123 selects a candidate endpoint with a highest access ranking from the series of candidate endpoints as the partner endpoint of the ego vehicle 123.

Operations similar to those described above in procedure (f) can be performed to identify the partner endpoint of the ego vehicle 123, and similar description will not be repeated here.

Procedure (VII): The transmitter-mode processing module 212 of the ego vehicle 123 wirelessly communicates via a selected V2X channel with the partner endpoint to offload its sensor data to the partner endpoint. Without loss of generality, assume that the remote vehicle 116 in the receiver mode or the roadside unit 118 is identified as the partner endpoint of the ego vehicle 123. The selected V2X channel is a V2X channel that is supported by both endpoints (the ego vehicle 123 and the partner endpoint of the ego vehicle 123) and is a best fit for this communication given a distance separating the two endpoints, whether obstructions are present between the two endpoints, speeds of the two endpoints, headings of the two endpoints, and future paths of travel of the two endpoints.

Procedure (VIII): The providing module 214 of the partner endpoint of the ego vehicle 123 receives a V2X message including the sensor data of the ego vehicle 123 from the ego vehicle 123 and stores the sensor data in a memory or a storage of the partner endpoint.

Procedure (VIII): The providing module 214 of the partner endpoint waits for the communication unit 195 of the partner endpoint to be connected to a network (e.g., a home wireless network) via the communication device again. When the communication unit 195 of the partner endpoint is reconnected to the network via the communication device, the providing module 214 of the partner endpoint includes sensor data of the ego vehicle 123 as well as the sensor data generated by the partner endpoint into its digital data and uploads the digital data to the cloud server 120 using the communication device (e.g., a home router).

An example where the partner endpoint of the ego vehicle 123 is the roadside unit 118 is briefly described below (referred to as a V2I scenario). The feedback system 199 of the ego vehicle 123 that is in the transmitter mode uploads its sensor data to the roadside unit 118. The roadside unit 118 then uploads the sensor data to the cloud server 120. This V2I scenario can be beneficial, for example, if a suitable remote vehicle is not present to operate as a partner endpoint for uploading the ego vehicle's sensor data to the cloud server 120. An additional benefit includes the following: since the roadside unit 118 can relay the ego vehicle's sensor data to the cloud server 120 in near real time, modification data can be generated by the cloud server 120 based on the received sensor data and sent back to the ego vehicle 123 via the roadside unit 118 in near real time, which causes the modification module 218 described below to modify a vehicle component of the ego vehicle 123 so as to improve safety and efficiency of the ego vehicle 123 in near real time.

A modified version of procedures (I)-(VIIII) is now described below for embodiments of the feedback system 199 of the ego vehicle 123 that utilizes V2I to offload sensor data from the ego vehicle 123 to the roadside unit 118 which then uploads the sensor data to the cloud server 120 on behalf of the ego vehicle 123. The roadside unit 118 also includes a version of the feedback system 199.

Procedure (I): The transmitter-mode processing module 212 of the ego vehicle 123 monitors for availability messages from one or more endpoints including one or more of the remote vehicle 116 and the roadside unit 118.

Procedure (II): The transmitter-mode processing module 212 of the ego vehicle 123 receives one or more availability messages via V2X communication from the one or more endpoints. At least one of the availability messages is received from the roadside unit 118 via V2I communication from the roadside unit 118.

Procedure (III): The transmitter-mode processing module 212 of the ego vehicle 123 generates its own availability data describing its own availability message.

Procedure (1111): The transmitter-mode processing module 212 of the ego vehicle 123 decodes availability data of the one or more endpoints from the one or more availability messages received at procedure (II). The decoded availability data includes availability data of the roadside unit 118.

Procedure (V): The transmitter-mode processing module 212 of the ego vehicle 123 generates a local dynamic map that describes a first geographic location of the ego vehicle 123 and one or more second geographic locations of one or more endpoints (which includes a geographic location of the roadside unit 118) on a map. For example, the transmitter-mode processing module 212 of the ego vehicle 123 generates LDM data describing the local dynamic map based on the availability data of the ego vehicle 123 generated at procedure (III) and the availability data of the one or more endpoints decoded at procedure (1111) (which includes the availability data of the roadside unit 118).

For example, the transmitter-mode processing module 212 of the ego vehicle 123 forms endpoint-geolocation pairs on the local dynamic map. For each of the endpoint-geolocation pairs that includes a corresponding endpoint and a geographic location of the corresponding endpoint, the local dynamic map includes one or more of the following endpoint information: (1) an access ranking of the endpoint; (2) a predicted future path of the endpoint (if the endpoint is a roadside unit, the predicted future path is "zero" or "null"); (3) a speed of the endpoint (if the endpoint is a roadside unit, the speed is "zero" or "null"); (4) a heading of the endpoint (if the endpoint is a roadside unit, the heading is "zero" or "null"); (5) capacity data describing an available memory capacity of the endpoint (e.g., in bytes); (6) one or more forms of vehicle-to-anything (V2X) communication supported by the endpoint (if the endpoint is a roadside unit, the one or more forms of V2X communication are one or more forms of V2I communication); and (7) a corresponding transmission rate achieved for each of the one or more forms of V2X communication (if the endpoint is a roadside unit, the corresponding transmission rate is a transmission rate achieved for each of the one or more forms of V2I communication).

Procedure (VI): The transmitter-mode processing module 212 of the ego vehicle 123 performs the following operations: (1) retrieving ranking data that describes one or more access rankings of the one or more endpoints from the availability data decoded at procedure (IIII), as well as ranking data describing an access ranking of the ego vehicle 123 from the availability data generated at procedure (III); and (2) identifying a partner endpoint of the ego vehicle 123 from the one or more endpoints based on the local dynamic map generated at procedure (V) and the ranking data of the one or more endpoints.

In some embodiments, the transmitter-mode processing module 212 of the ego vehicle 123 analyzes the local dynamic map to determine a series of candidate endpoints each having a context that leads to an offload likelihood to be greater than a threshold. The transmitter-mode processing module 212 of the ego vehicle 123 selects a candidate endpoint with a highest access ranking from the series of candidate endpoints as the partner endpoint of the ego vehicle 123. If one of the candidate endpoints is a roadside unit 118, it is likely that the roadside unit 118 may have the highest ranking among the series of the candidate endpoints because its static nature means that it may have more stable and established wireless connectivity. Of course, the selection of the roadside unit 118 is not merely due to the access ranking of the roadside unit 118, other context factors are also taken into consideration. The other context factors include, but are not limited to: forms of V2X communication supported by the roadside unit 118; transmission rates for the different forms of V2I communication; and a location of the roadside unit 118 relative to the ego vehicle 123, etc. Without loss of generality, assume that the roadside unit 118 is identified as the partner endpoint of the ego vehicle 123.

Procedure (VII): The transmitter-mode processing module 212 of the ego vehicle 123 wirelessly communicates via a selected V2I channel with the roadside unit 118 to offload its sensor data to the roadside unit 118. The selected V2I channel is a V2I channel that is supported by both the ego vehicle 123 and the roadside unit 118 and is a best fit for this communication given a distance separating the ego vehicle 123 and the roadside unit 118, whether obstructions are present between the ego vehicle 123 and the roadside unit 118, a speed, a heading, and a future path of travel of the ego vehicle 123.

Procedure (VIII): The providing module 214 of the roadside unit 118 receives a V2I message including the sensor data of the ego vehicle 123 from the ego vehicle 123 and stores the sensor data in a memory or a storage of the roadside unit 118.

Procedure (VIII): The providing module 214 of the roadside unit 118 includes sensor data of the ego vehicle 123 as well as other sensor data generated by the roadside unit 118 (or received from other vehicles) into its digital data and uploads the digital data to the cloud server 120.

In some embodiments, the providing module 214 can be a set of instructions executable by the processor 125 which are operable, when executed by the processor 125, to cause the processor 125 to provide data to a communication device for uploading to the cloud server 120 or to provide data to a partner endpoint of the ego vehicle 123 for relaying to the cloud server 120. In some embodiments, the providing module 214 can be stored in the memory 127 of the computer system 200 and can be accessible and executable by the processor 125. The providing module 214 may be adapted for cooperation and communication with the processor 125 and other components of the computer system 200 via a signal line 287.

In some embodiments, the providing module 214 provides or attempts to provide, by the communication unit 195 of the ego vehicle 123, digital data to a communication device based on a mode of the communication unit 195, where the digital data is relayed by the communication device to be received by the cloud server 120. The mode of the communication unit can be one of a receiver mode and a transmitter mode. For example, in response to the communication unit 195 of the ego vehicle 123 being in the receiver mode, the providing module 214 provides the digital data to the communication device, so that the digital data is relayed by the communication device to be received by the cloud server 120.

The providing module 214 is described above with reference to procedure (h)-(i) and procedure (VII)-(VIIII), and similar description will not be repeated here.

In some embodiments, the machine learning module 216 can be a set of instructions executable by the processor 125 which are operable, when executed by the processor 125, to cause the processor 125 to determine feedback describing a bandwidth constraint of the communication unit 195 of the ego vehicle 123. In some embodiments, the machine learning module 216 can be stored in the memory 127 of the computer system 200 and can be accessible and executable by the processor 125. The machine learning module 216 may be adapted for cooperation and communication with the processor 125 and other components of the computer system 200 via a signal line 288.

In some embodiments, the machine learning module 216 cooperates with the monitoring module 204 to monitor for a connectivity access (e.g., network patterns) of a network provided by the communication device when the network is accessed via the communication unit 195 of the ego vehicle 123, and generates feedback based on a monitoring result. The feedback may describe a bandwidth constraint of the communication unit 195 of the ego vehicle 123.

In a first example, in response to the communication unit 195 of the ego vehicle 123 being in the receiver mode, the providing module 214 provides the digital data to the communication device. In a second example, initially the communication unit 195 of the ego vehicle 123 is set to be in the receiver mode as an initial state, the providing module 214 attempts to provide digital data to the communication device to find out whether the digital data can be successfully received by the cloud server 120 via the communication device. In both of the examples, the machine learning module 216 cooperates with the monitoring module 204 to monitor for a connectivity access of the communication unit 195. If the digital data is relayed by the communication device and received by the cloud server 120 successfully, the machine learning module 216 may determine feedback describing that there is no bandwidth constraint on the communication unit 195 (e.g., the machine learning module 216 may determine feedback describing a "zero" or "null" bandwidth constraint), so that the communication unit 195 remains in the receiver mode. However, if the communication device fails to relay the digital data to be received by the cloud server 120, the machine learning module 216 may determine feedback describing that there is a bandwidth constraint on the communication unit 195 (e.g., the machine learning module 216 may determine feedback describing a "true" bandwidth constraint), so that the mode of the communication unit 195 is modified by the modification module 218 from the receiver mode to the transmitter mode based on the feedback data.

In some embodiments, the machine learning module 216 may apply one or more of a deep learning algorithm, one or more neural networks or other machine learning methods to monitor for a connectivity access of the communication unit 195 and generate the feedback.

In some embodiments, the modification module 218 can be a set of instructions executable by the processor 125 which are operable, when executed by the processor 125, to cause the processor 125 to perform modification operations.

In some embodiments, the modification module 218 can be stored in the memory 127 of the computer system 200 and can be accessible and executable by the processor 125. The modification module 218 may be adapted for cooperation and communication with the processor 125 and other components of the computer system 200 via a signal line 289.

In some embodiments, the modification module 218 is operable to modify the mode of the communication unit 195 of the ego vehicle 123 based on the feedback so that the mode is consistent with the bandwidth constraint and the digital data is successfully received by the cloud server 120. In this case, the bandwidth constraint of the communication unit 195 is removed by modifying the mode of the communication unit 195.

For example, assume that the feedback generated by the machine learning module 216 describes that there is a bandwidth constraint on the communication unit 195 of the ego vehicle 123 that prevents the ego vehicle 123 from uploading sensor data to the cloud server 120 via the communication device (e.g., the router 112). Then, the modification module 218 modifies the mode of the communication unit 195 of the ego vehicle 123 from the receiver mode to the transmitter mode so that the bandwidth constraint of the communication unit 195 is removed. In this case, the communication unit 195 is modified from the receiver mode to the transmitter mode, so that instead of using wireless communication with the communication device that causes the bandwidth constraint, the communication unit 195 of the ego vehicle 123 uses V2X communication to relay its digital data to a connected endpoint (e.g., a remote vehicle or roadside unit) that has no bandwidth constraint, and so, the digital data from the ego vehicle 123 is uploaded to the cloud server 120 via the connected endpoint.

In another example, assume that the feedback generated by the machine learning module 216 describes that there is no bandwidth constraint on the communication unit 195 of the ego vehicle 123 (e.g., there is a "zero" or "null" bandwidth constraint on the communication unit 195). Then, the modification module 218 keeps the mode of the communication unit 195 of the ego vehicle 123 to be the receiver mode, so that the communication unit 195 of the ego vehicle 123 continues to provide its digital data (including sensor data generated by the ego vehicle 123 as well as sensor data from other vehicles) to the communication device (e.g., the router 112) for uploading to the cloud server 120.

As a result, the ego vehicle 123 (or any another vehicle), regardless of having a bandwidth constraint or having no bandwidth constraint, can upload its digital data to the cloud server 120 timely. Thus, the efficiency of digital data upload to the cloud server 120 is improved, which may lead to a shorter time for the analysis module 194 of the cloud server 120 to generate the modification data such that functionality of the ego vehicle 123 can be improved promptly (e.g., in near real time) based on the modification data. For example, the modification data can make the operation of the ego vehicle 123 (e.g., operation of hardware and software in the ego vehicle 123) safer and more efficient.

In some embodiments, the modification module 218 is operable to receive modification data from the cloud server 120 and causes a modification of a vehicle component based on the modification data. The modification data is determined based on digital data that is successfully received by the cloud server 120. For example, the vehicle component is the ADAS system 191 of the ego vehicle 123 which is modified based on the modification data to make the ego vehicle 123 safer and more efficient. In a further example, the modification data modifies a real-time safety process of the ego vehicle 123 which is provided by the ADAS system 191 and increases safety of the ego vehicle 123. In yet another example, the modification data modifies an operation of a braking system of the ego vehicle 123 and the operation of the braking system is controlled by the ADAS system 191.

A real-time example process for improving safety of the ego vehicle 123 with the aid of the timely-uploaded sensor data to the cloud server 120 is described here. In the example process, assume that the ego vehicle 123 has a bandwidth constraint and therefore is modified from the receiver mode to the transmitter mode. The ego vehicle 123 selects the roadside unit 118 as a partner endpoint for uploading its sensor data to the cloud server 120. Because the ego vehicle 123 transmits its sensor data to the roadside unit 118 in real time, which causes the roadside unit 118 to forward the sensor data of the ego vehicle 123 to the cloud server 120 immediately, the analysis module 194 of the cloud server 120 can analyze the sensor data to identify any potential hazards (e.g., potential collisions, icy roads, etc.) surround the ego vehicle 123, and therefore generate modification data for controlling the ego vehicle 123 to cope with the potential hazards safely in real time. Upon receiving the modification data from the cloud server 120 via the roadside unit 118, the ADAS system 191 of the ego vehicle 123 can control accelerators, brakes, and steering wheels of the ego vehicle 123 based on the modification data in real time. In some scenarios, the ego vehicle 123 can also provide warnings to the driver of the ego vehicle 123 based on the modification data.

Example Processes

Figure 3A:
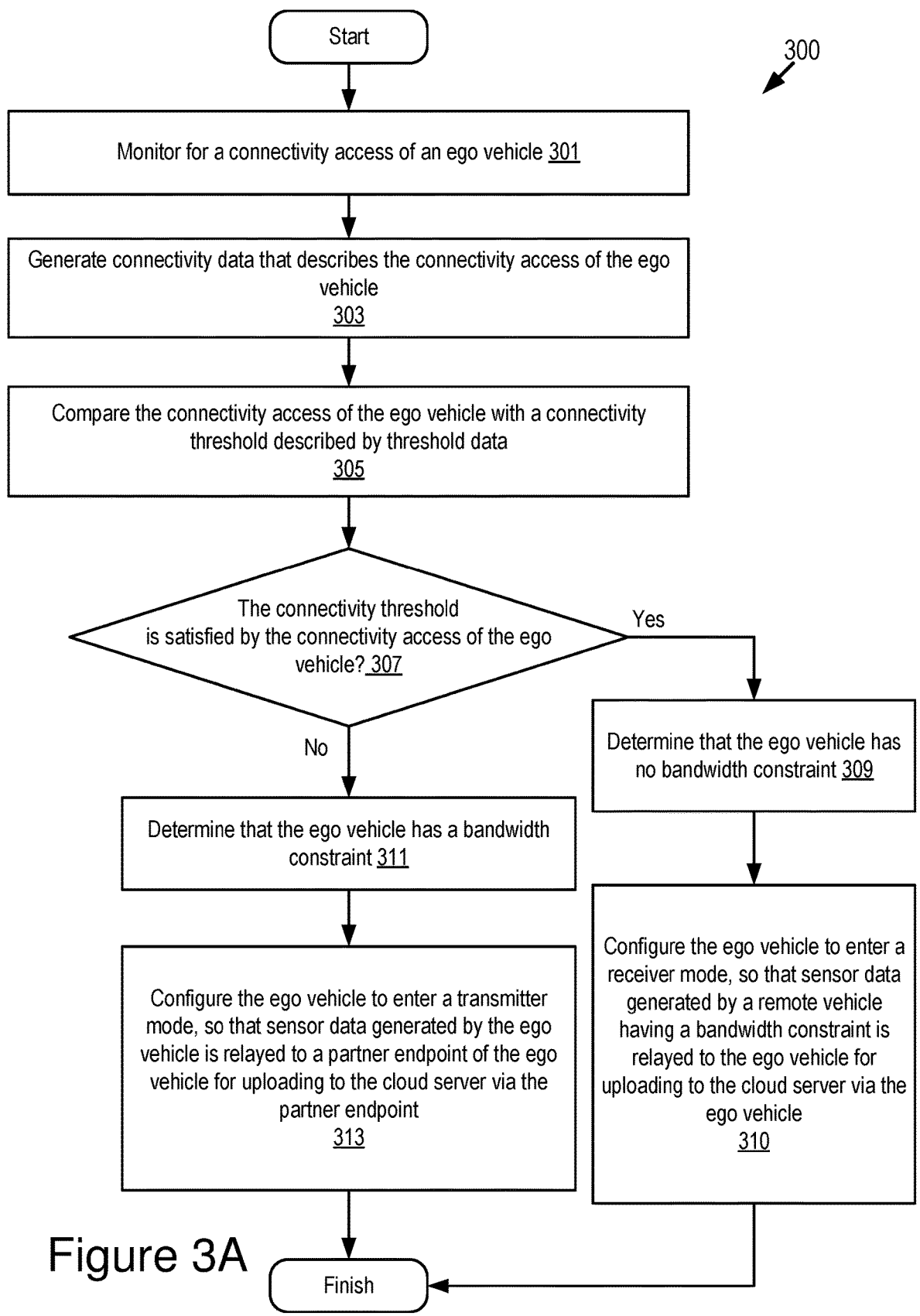
FIG. 3A depicts a method for performing V2X data transfer by an ego vehicle according to some embodiments.

FIG. 3A depicts a method 300 for performing V2X data transfer by the ego vehicle 123 according to some embodiments. The steps of the method 300 are executable in any order, and not necessarily the order depicted in FIG. 3A.

At step 301, the monitoring module 204 monitors for a connectivity access of the ego vehicle 123 with respect to a network provided by a communication device. For example, the network can be a home wireless network provided by a home router.

At step 303, the monitoring module 204 generates connectivity data that describes the connectivity access of the ego vehicle 123. For example, the monitoring module 204 generates the connectivity data based on a monitoring result obtained at step 301.

At step 305, the determination module 206 compares the connectivity access of the ego vehicle 123 with a connectivity threshold described by threshold data.

At step 307, the determination module 206 determines whether the connectivity threshold is satisfied by the connectivity access of the ego vehicle 123. If the connectivity threshold is satisfied by the connectivity access, then the method 300 proceeds to step 309; otherwise, the method 300 proceeds to step 311.

At step 309, the determination module 206 determines that the ego vehicle 123 has no bandwidth constraint.

At step 310, the determination module 206 configures the ego vehicle 123 to enter a receiver mode, so that sensor data generated by a remote vehicle 116 having a bandwidth constraint is relayed to the ego vehicle 123. The providing module 214 includes the sensor data of the remote vehicle 116 as well as sensor data of the ego vehicle 123 into digital data and uploads the digital data to the cloud server 120 by providing the digital data to the communication device so that the communication device forwards the digital data to the cloud server 120.

At step 311, the determination module 206 determines that the ego vehicle has a bandwidth constraint.

At step 313, the determination module 206 configures the ego vehicle 123 to enter a transmitter mode, so that sensor data generated by the ego vehicle 123 is relayed to a partner endpoint of the ego vehicle 123. The partner endpoint includes the sensor data generated by the ego vehicle 123 into its digital data and uploads its digital data to the cloud server 120.

Figure 3B:
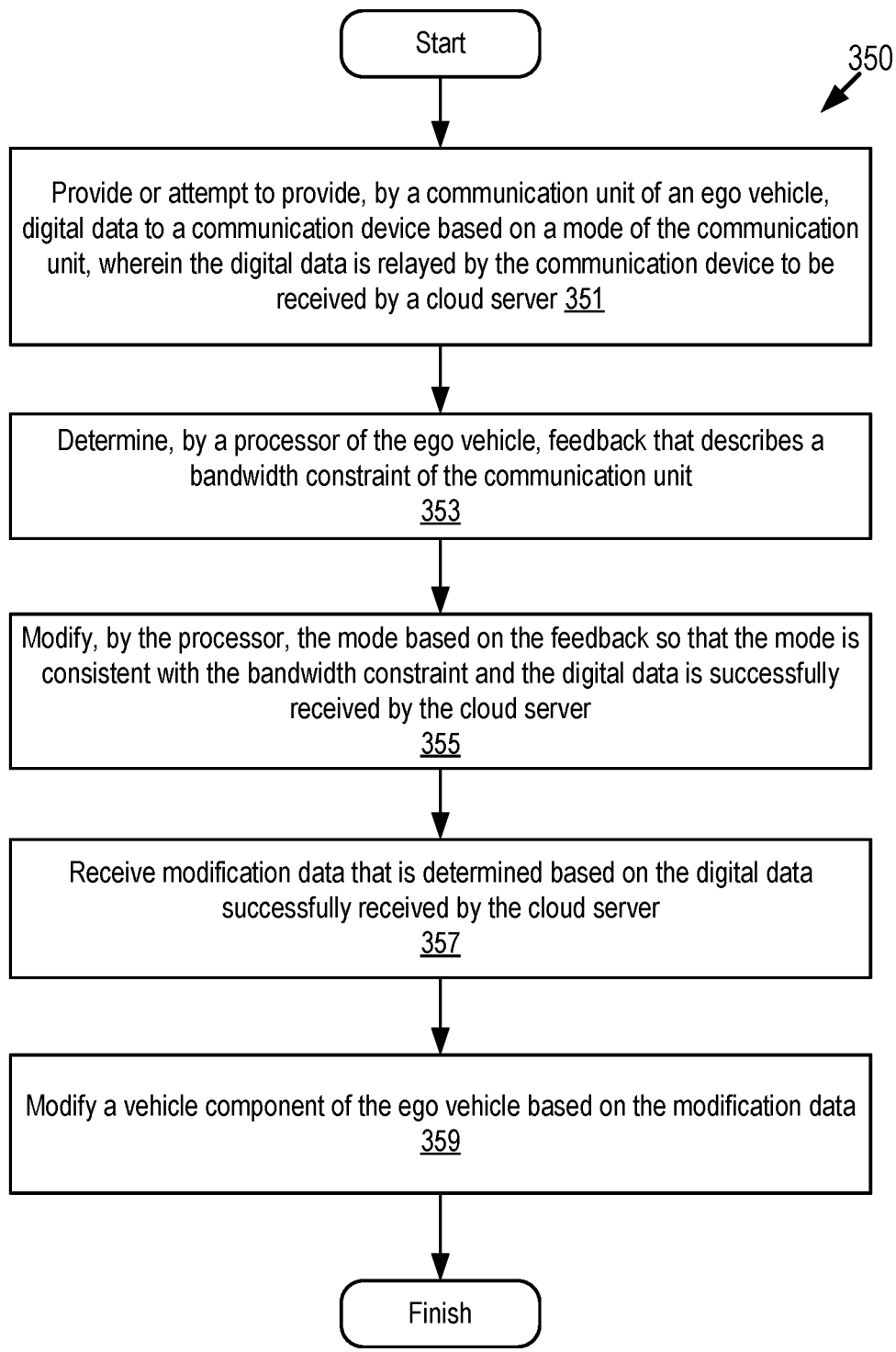
FIG. 3B depicts another method for performing V2X data transfer by an ego vehicle according to some embodiments.

FIG. 3B depicts another method 350 for performing V2X data transfer by the ego vehicle 123 according to some embodiments. The steps of the method 350 are executable in any order, and not necessarily the order depicted in FIG. 3B.

At step 351, the providing module 214 provides or attempts to provide, by the communication unit 195 of the ego vehicle 123, digital data to a communication device based on a mode of the communication unit 195, where the digital data is relayed by the communication device to be received by the cloud server 120. In some embodiments, the digital data includes sensor data recorded by one or more sensors and the one or more sensors are elements of one or more of the ego vehicle 123 and the remote vehicle 116.

At step 353, the machine learning module 216 determines, by a processor 125 of the ego vehicle 123, feedback that describes a bandwidth constraint of the communication unit 195.

For example, the communication device is a router and the bandwidth constraint is caused by a factor selected from a group that consists of the following: the router does not exist; the communication unit 195 cannot wirelessly communicate with the router; the router is outside of a transmission range of the communication unit 195; the router has poor access to a wireless network; the router does not have access to the wireless network; and the communication unit 195 does not store a password for the router so that the communication unit 195 is not authenticated to wirelessly communicate with the router.

At step 355, the modification module 218 modifies, by the processor 125, the mode based on the feedback so that the mode is consistent with the bandwidth constraint and the digital data is successfully received by the cloud server 120. For example, by modifying the mode of the communication unit 195, the modification module 218 removes the bandwidth constraint of the communication unit 195.

For example, the modification module 218 modifies the mode based on the feedback by selecting a selected mode for the modification from a group that includes: a receiver mode; and a transmitter mode. In some embodiments, the selected mode is the receiver mode and the digital data includes sensor data recorded by the ego vehicle 123 and a set of remote vehicles 116. The communication unit 195 of the ego vehicle 123 operates in the receiver mode by (1) receiving the sensor data of the set of remote vehicles 116 and (2) including the sensor data of the set of remote vehicles 116 in the digital data that is provided to the communication device.

In some embodiments, the selected mode is the transmitter mode, and the communication unit 195 of the ego vehicle 123 operates in the transmitter mode by stopping the providing of the digital data to the communication device and instead providing the digital data to a remote vehicle 116 that is a connected vehicle that will take steps to relay the digital data to the cloud server 120. The connected vehicle is one having no bandwidth constraint that prevents the relay of the digital data to the cloud server 120.

At step 357, the modification module 218 receives modification data that is determined based on the digital data successfully received by the cloud server 120.

At step 359, the modification module 218 modifies a vehicle component of the ego vehicle 123 based on the modification data. In some embodiments, the ego vehicle 123 is an autonomous vehicle and the vehicle component is the ADAS system 191 which is modified based on the modification data. For example, the modification data modifies a real-time safety process of the autonomous vehicle which is provided by the ADAS system 191 and increases safety of the autonomous vehicle. In another example, the modification data modifies an operation of a braking system of the ego vehicle 123 and the operation of the braking system is controlled by the ADAS system 191.

Figure 4:
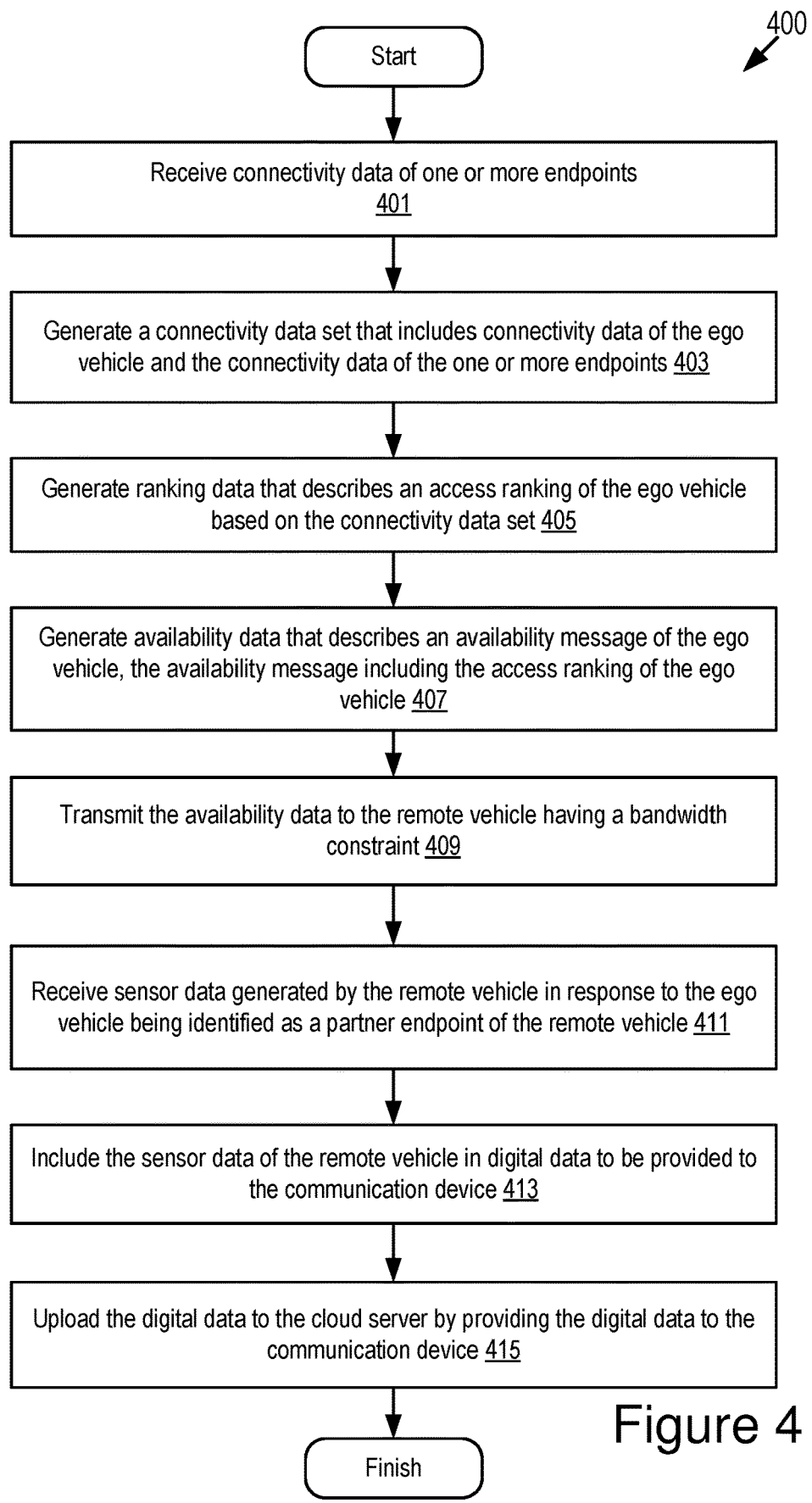
FIG. 4 depicts a method for operating in a receiver mode by an ego vehicle according to some embodiments.

FIG. 4 depicts a method 400 for operating in a receiver mode by the ego vehicle 123 according to some embodiments. The steps of the method 400 are executable in any order, and not necessarily the order depicted in FIG. 4.

At step 401, the ranking module 208 receives connectivity data of one or more endpoints.

At step 403, the ranking module 208 generates a connectivity data set that includes connectivity data of the ego vehicle 123 and the connectivity data of the one or more endpoints.

At step 405, the ranking module 208 generates ranking data that describes an access ranking of the ego vehicle 123 based on the connectivity data set.

At step 407, the receiver-mode processing module 210 generates availability data that describes an availability message of the ego vehicle 123. The availability message includes, among others, the access ranking of the ego vehicle 123.

At step 409, the receiver-mode processing module 210 transmits the availability data to the remote vehicle 116 having a bandwidth constraint. Here, the remote vehicle 116 has a bandwidth constraint that prevents it from uploading its sensor data to the cloud server 120. For example, the remote vehicle 116 has no access or poor access to a home wireless network at the remote vehicle's home so that the remote vehicle 116 cannot upload its sensor data to the cloud server 120 via the home wireless network.

At step 411, the providing module 214 receives sensor data generated by the remote vehicle 116 in response to the ego vehicle 123 being identified as a partner endpoint of the remote vehicle 116.

At step 413, the providing module 214 includes the sensor data of the remote vehicle 116 into digital data of the ego vehicle 123 to be provided to the communication device.

At step 415, the providing module 214 uploads the digital data to the cloud server 120 by providing the digital data to the communication device. For example, the providing module 214 uploads the digital data to the cloud server 120 by providing the digital data to a home router at the ego vehicle's home, so that the home router forwards the digital data to the cloud server 120.

Figure 5:
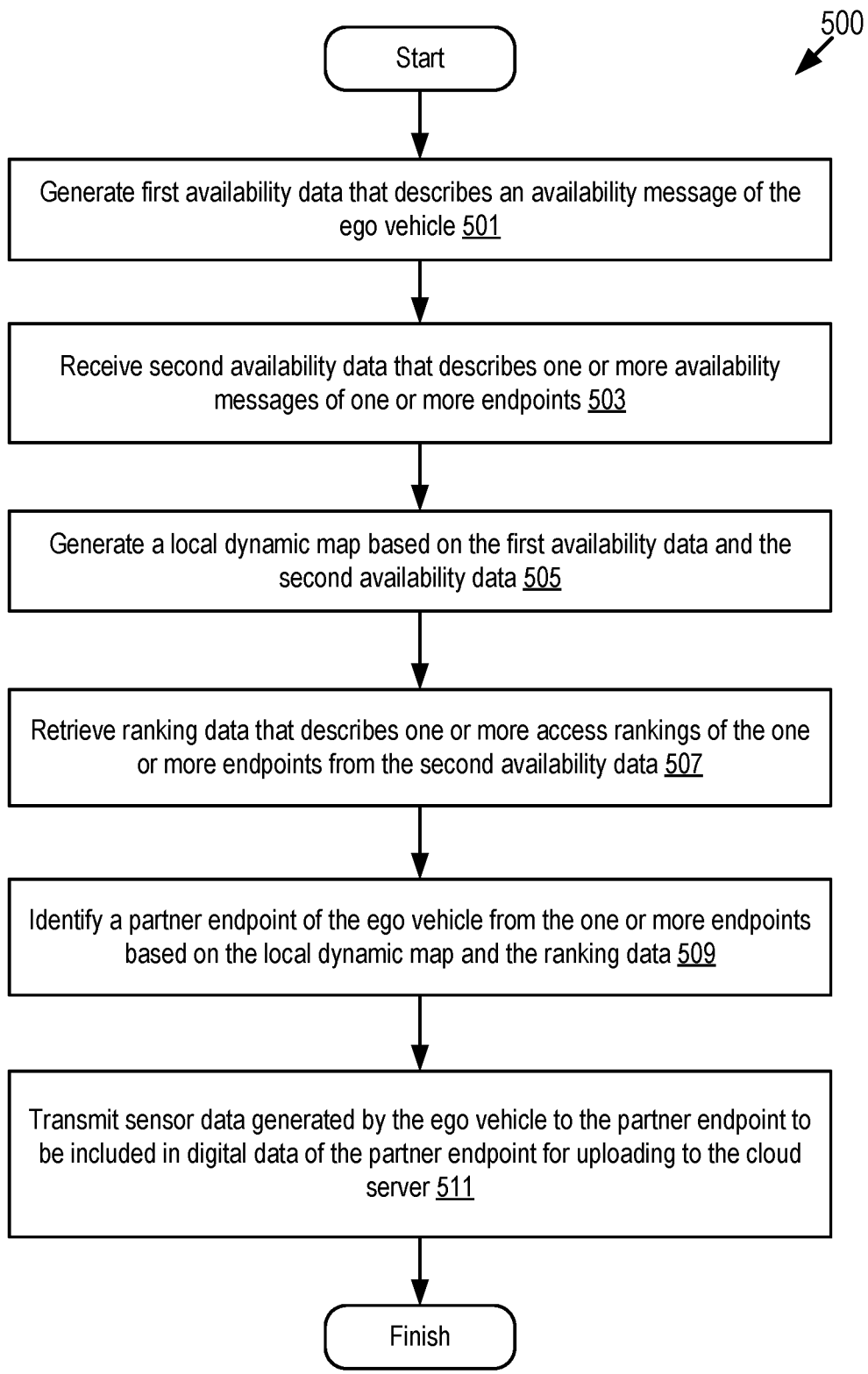
FIG. 5 depicts a method for operating in a transmitter mode by an ego vehicle according to some embodiments.

FIG. 5 depicts a method for operating in a transmitter mode by the ego vehicle 123 according to some embodiments. The steps of the method are executable in any order, and not necessarily the order depicted in FIG. 5.

At step 501, the transmitter-mode processing module 212 generates first availability data that describes an availability message of the ego vehicle 123.

At step 503, the transmitter-mode processing module 212 receives second availability data that describes one or more availability messages of one or more endpoints via V2X communication with the one or more endpoints. The one or more endpoints include one or more of the remote vehicle 116, the roadside unit 118 and other endpoints.

At step 505, the transmitter-mode processing module 212 generates a local dynamic map based on the first availability data and the second availability data.

At step 507, the transmitter-mode processing module 212 retrieves ranking data that describes one or more access rankings of the one or more endpoints from the one or more availability messages respectively.

At step 509, the transmitter-mode processing module 212 identifies a partner endpoint of the ego vehicle 123 form the one or more endpoints based on the local dynamic map and the ranking data. For example, the partner endpoint of the ego vehicle 123 can be one of the remote vehicle 116 in a receiver mode, the roadside unit 118 or any other connected endpoint that has no bandwidth constraint.

At step 511, the providing module 214 transmits sensor data generated by the ego vehicle 123 to the partner endpoint of the ego vehicle 123, so that the sensor data of the ego vehicle 123 is included in digital data of the partner endpoint for uploading to the cloud server 120.

FIG. 6 depicts an example process 600 when the ego vehicle 123 operates in a receiver mode according to some embodiments. The steps of the example process 600 are executable in any order, and not necessarily the order depicted in FIG. 6.

At step 601, the receiver-mode processing module 210 of the ego vehicle 123 in the receiver mode generates first availability data that describes an availability message of the ego vehicle 123.

At step 603, the receiver-mode processing module 210 of the ego vehicle 123 transmits the first availability data to the remote vehicle 116 that is in a transmitter mode via V2X communication.

At step 605, the transmitter-mode processing module 212 of the remote vehicle 116 receives second availability data that describes one or more availability messages of one or more endpoints via V2X communication with the one or more endpoints. The one or more endpoints include one or more of the remote vehicle 116, the roadside unit 118 and other endpoints.

At step 606, the transmitter-mode processing module 212 of the remote vehicle 116 generates a local dynamic map based on the first availability data and the second availability data.

At step 607, the transmitter-mode processing module 212 of the remote vehicle 116 retrieves ranking data that describes one or more access rankings of the one or more endpoints from the second availability data and ranking data that describes an access ranking of the ego vehicle 123 form the first availability data, respectively.

At step 609, the transmitter-mode processing module 212 of the remote vehicle 116 identifies a partner endpoint of the remote vehicle 116 form the one or more endpoints and the ego vehicle 123 based on the local dynamic map, the ranking data of the one or more endpoints and the ranking data of the ego vehicle 123. For example, the partner endpoint of the remote vehicle 116 can be one of the ego vehicle 123 in the receiver mode, the roadside unit 118 or another connected endpoint that has no bandwidth constraint. Here, without loss of generality, assume that the ego vehicle 123 is selected as the partner endpoint of the remote vehicle 116.

At step 611, the providing module 214 of the remote vehicle 116 transmits sensor data generated by the remote vehicle 116 to the partner endpoint (e.g., the ego vehicle 123), so that the sensor data of the remote vehicle 116 is included in digital data of the partner endpoint for uploading to the cloud server 120.

At step 613, the providing module 214 of the ego vehicle 123 includes the sensor data of the remote vehicle 116 as well as sensor data generated by the ego vehicle 123 in its digital data and uploads the digital data to the cloud server 120 by providing the digital data to the communication device.

FIG. 7 depicts an example process 700 when the ego vehicle 123 operates in a transmitter mode according to some embodiments. The steps of the example process 700 are executable in any order, and not necessarily the order depicted in FIG. 7. The ego vehicle 123 communicates with a first endpoint that can be a remote vehicle, a roadside unit, or another endpoint. The first endpoint has its own version of the feedback system 199.

At step 701, the receiver-mode processing module 210 of the first endpoint in a receiver mode generates first availability data that describes an availability message of the first endpoint.

At step 703, the receiver-mode processing module 210 of the first endpoint transmits the first availability data to the ego vehicle 123 that is in the transmitter mode via V2X communication.

At step 705, the transmitter-mode processing module 212 of the ego vehicle 123 receives second availability data that describes one or more availability messages of one or more other endpoints via V2X communication with the one or more other endpoints. The one or more other endpoints include one or more of a remote vehicle, a roadside unit, and other endpoints.

At step 706, the transmitter-mode processing module 212 of the ego vehicle 123 generates a local dynamic map based on the first availability data and the second availability data.

At step 707, the transmitter-mode processing module 212 of the ego vehicle 123 retrieves first ranking data that describes an access ranking of the first endpoint form the first availability data and second ranking data that describes one or more access rankings of the one or more other endpoints from the second availability data, respectively.

At step 709, the transmitter-mode processing module 212 of the ego vehicle 123 identifies a partner endpoint of the ego vehicle 123 form the one or more other endpoints and the first endpoint based on the local dynamic map, the second ranking data of the one or more other endpoints and the first ranking data of the first endpoint. For example, the partner endpoint of the ego vehicle 123 can be the first endpoint in the receiver mode or another connected endpoint that has no bandwidth constraint. Here, without loss of generality, assume that the first endpoint is selected as the partner endpoint of the ego vehicle 123.

At step 711, the providing module 214 of the ego vehicle 123 transmits sensor data generated by the ego vehicle 123 to the partner endpoint (e.g., the first endpoint), so that the sensor data of the ego vehicle 123 is included in digital data of the partner endpoint for uploading to the cloud server 120.

At step 713, the providing module 214 of the first endpoint includes the sensor data of the ego vehicle 123 as well as sensor data generated by the first endpoint into its digital data and uploads the digital data to the cloud server 120 by providing the digital data to the communication device.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
providing or attempting to provide, by a communication unit of an ego vehicle, digital data to a WiFi router based on a mode of the communication unit;
monitoring, by a machine-learning algorithm of the ego vehicle, network patterns that describe connectivity access of the communication unit;
determining whether the connectivity access satisfies a connectivity threshold; and
responsive to the connectivity access failing to satisfy the connectivity threshold, selecting to operate in a transmitter mode that includes providing or attempting to provide the digital data to a remote vehicle having no bandwidth constraint that prevents a relay of the digital data to a server, wherein the transmitter mode further includes the following steps:
receiving connectivity data of one or more other endpoints, the one or more other endpoints including the remote vehicle;
generating an access ranking of the ego vehicle based on a connectivity of the ego vehicle and the connectivity data of the one or more other endpoints;
generating a local dynamic map that describes a first geographic location of the ego vehicle and one or more second geographic locations of one or more other endpoints including the remote vehicle, wherein the local dynamic map includes the access ranking; and
relaying the digital data to the remote vehicle for transmission to the server based on the local dynamic map that includes the access ranking.

2. The method of claim 1, wherein relaying the digital data to the remote vehicle is further based on existence of a line of sight between the ego vehicle and the remote vehicle.

3. The method of claim 1, further comprising receiving modification data that is operable to modify a vehicle component of the ego vehicle, wherein the modification data is determined based on the digital data that is successfully received by the server so that providing the digital data to the server causes a modification of the vehicle component.

4. The method of claim 3, wherein the ego vehicle is an autonomous vehicle and the vehicle component is an Advanced Driver Assistance System (ADAS system) which is modified based on the modification data.

5. The method of claim 4, wherein the modification data modifies a real-time safety process of the autonomous vehicle which is provided by the ADAS system and increases safety of the autonomous vehicle.

6. The method of claim 4, wherein the modification data modifies an operation of a braking system of the ego vehicle and the operation of the braking system is controlled by the ADAS system.

7. The method of claim 1, wherein the WiFi router is for a home wireless network and the connectivity access is based on a determination selected from a group that consists of the following: the WiFi router does not exist; the communication unit cannot wirelessly communicate with the WiFi router; the WiFi router is outside of a transmission range of the communication unit; the WiFi router has poor access to a wireless network; the WiFi router does not have access to the wireless network; or the communication unit does not store a password for the WiFi router so that the communication unit is not authenticated to wirelessly communicate with the WiFi router.

8. The method of claim 1, further comprising:
retrieving ranking data that describes one or more access rankings of one or more endpoints;
identify a partner endpoint based on the ranking data; and
transmit sensor data to the partner endpoint.

9. The method of claim 1, wherein the machine-learning algorithm includes deep learning or a neural network.

10. The method of claim 1, wherein the ego vehicle is in a receiver mode before switching to the transmitter mode.

11. The method of claim 10, wherein the digital data includes sensor data recorded by the ego vehicle and a set of remote vehicles.

12. The method of claim 10, wherein operating in the receiver mode includes receiving sensor data of a set of remote vehicles and including the sensor data of the set of remote vehicles in the digital data that is provided to the remote vehicle in the transmitter mode.

13. A system comprising:
an onboard vehicle computer system of an ego vehicle, including a communication unit, a processor and a non-transitory memory storing computer code which, when executed by the processor causes the processor to:
provide or attempt to provide, via the communication unit of the ego vehicle, digital data to a WiFi router based on a mode of the communication unit;
monitor, by a machine-learning algorithm of the ego vehicle, network patterns that describe connectivity access of the communication unit;
determine whether the connectivity access satisfies a connectivity threshold; and
responsive to the connectivity access failing to satisfy the connectivity threshold, select to operate in a transmitter mode that includes providing or attempting to provide the digital data to a remote vehicle having no bandwidth constraint that prevents a relay of the digital data to a server, the transmitting mode further causing the processor to:
receive connectivity data of one or more other endpoints, the one or more other endpoints including the remote vehicle;
generate an access ranking of the ego vehicle based on a connectivity of the ego vehicle and the connectivity data of the one or more other endpoints;
generate a local dynamic map that describes a first geographic location of the ego vehicle and one or more second geographic locations of one or more other endpoints including the remote vehicle, wherein the local dynamic map includes the access ranking; and
relay the digital data to the remote vehicle for transmission to the server based on the local dynamic map that includes the access ranking.

14. The system of claim 13, wherein the computer code, when executed by the processor, causes the processor further to:
receive modification data that is operable to modify a vehicle component of the ego vehicle, wherein the modification data is determined based on the digital data that is successfully received by the server so that providing the digital data to the server causes a modification of the vehicle component.

15. The system of claim 14, wherein the ego vehicle is an autonomous vehicle and the vehicle component is an Advanced Driver Assistance System (ADAS system) which is modified based on the modification data.

16. The system of claim 15, wherein the modification data modifies a real-time safety process of the autonomous vehicle which is provided by the ADAS system and increases safety of the autonomous vehicle.

17. The system of claim 15, wherein the modification data modifies an operation of a braking system of the ego vehicle and the operation of the braking system is controlled by the ADAS system.

18. The system of claim 13, wherein the ego vehicle is in a receiver mode before switching to the transmitter mode.

19. A non-transitory computer-readable medium comprising instructions that, when executed by a processor, causes the processor to perform operations comprising:
providing or attempting to provide, via a communication unit of an ego vehicle, digital data to a WiFi router based on a mode of the communication unit;
monitoring, by a machine-learning algorithm of the ego vehicle, network patterns that describe connectivity access of the communication unit;
determining whether the connectivity access satisfies a connectivity threshold; and
responsive to the connectivity access failing to satisfy the connectivity threshold, selecting to operate in a transmitter mode that includes providing or attempting to provide the digital data to a remote vehicle having no bandwidth constraint that prevents a relay of the digital data to a server, wherein the transmitter mode further includes the following operations:
receiving connectivity data of one or more other endpoints, the one or more other endpoints including the remote vehicle;
generating an access ranking of the ego vehicle based on a connectivity of the ego vehicle and the connectivity data of the one or more other endpoints;
generating a local dynamic map that describes a first geographic location of the ego vehicle and one or more second geographic locations of one or more other endpoints including the remote vehicle, wherein the local dynamic map includes the access ranking; and
relaying the digital data to the remote vehicle for transmission to the server based on the local dynamic map that includes the access ranking.

20. The non-transitory computer-readable medium of claim 19, wherein the operations further comprises receiving modification data that is operable to modify a vehicle component of the ego vehicle, wherein the modification data is determined based on the digital data that is successfully received by the server so that providing the digital data to the server causes a modification of the vehicle component.

* * * * *